United States Patent
Raghavan et al.

(10) Patent No.: US 11,856,570 B2
(45) Date of Patent: Dec. 26, 2023

(54) DYNAMIC MIXED MODE BEAM CORRESPONDENCE IN UPPER MILLIMETER WAVE BANDS

(71) Applicant: QUALCOMM Incorporated, San Diego, CA (US)

(72) Inventors: Vasanthan Raghavan, West Windsor Township, NJ (US); Tao Luo, San Diego, CA (US); Junyi Li, Franklin Park, NJ (US); Robert Keith Douglas, San Diego, CA (US); Alexander Dorosenco, El Cajon, CA (US)

(73) Assignee: QUALCOMM Incorporated, San Diego, CA (US)

( * ) Notice: Subject to any disclaimer, the term of this patent is extended or adjusted under 35 U.S.C. 154(b) by 84 days.

(21) Appl. No.: 17/157,915

(22) Filed: Jan. 25, 2021

(65) Prior Publication Data
US 2021/0235434 A1    Jul. 29, 2021

Related U.S. Application Data

(60) Provisional application No. 62/966,532, filed on Jan. 27, 2020.

(51) Int. Cl.
*H04W 72/044* (2023.01)
*H04W 72/0446* (2023.01)
*H04W 72/51* (2023.01)

(52) U.S. Cl.
CPC ..... *H04W 72/046* (2013.01); *H04W 72/0446* (2013.01); *H04W 72/51* (2023.01)

(58) Field of Classification Search
CPC .......... H04W 72/046; H04W 72/0446; H04W 72/048; H04B 7/088
See application file for complete search history.

(56) References Cited

U.S. PATENT DOCUMENTS

| 6,002,360 A | 12/1999 | Wolcott et al. |
| 7,826,415 B2 | 11/2010 | Oh et al. |

(Continued)

FOREIGN PATENT DOCUMENTS

| CN | 113287349 A | 8/2021 |
| CN | 113287349 B | 11/2022 |

(Continued)

OTHER PUBLICATIONS

Fraunhofer Iis, et al., "Discussion on Signaling of Beam Correspondence", 3GPP TSG RANWG1 Meeting #94bis, 3GPP Draft; R1-1811086_Discussion_on_Signaling_of_Beam_Correspondence, 3rd Generation Partnership Project (3GPP), Mobile Competence Centre; 650, Route Des Lucioles; F-06921 Sophia-Antipolis Cedex, vol. RAN WG1, No. Chengdu, China; Oct. 8, 2018-Oct. 12, 2018, Sep. 28, 2018 (Sep. 28, 2018), 5 Pages, XP051518487, Retrieved from the Internet: URL: http://www.3gpp.org/ftp/tsg%5Fran/WG1%5FRL1/TSGR1%5F94b/Docs/R1%201811086%2Ezip [retrieved on Sep. 28, 2018], Sections 2-4; Figures 1-3.

(Continued)

*Primary Examiner* — Jael M Ulysse
(74) *Attorney, Agent, or Firm* — Holland & Hart LLP/QUALCOMM Incorporated

(57) ABSTRACT

Methods, systems, and devices for wireless communications are described. A first device may indicate a dynamic beam correspondence operation for communications with a second device. For example, the dynamic beam correspondence operation may be declared in a time-dependent manner, for certain transmission configuration indication (TCI) states or time-dependent TCI states. Further, the first device may declare no beam correspondence and associated power savings and thermal reductions that result from the lack of beam correspondence. Subsequently, based on the dynamic beam correspondence operation, the second device may identify (Continued)

parameters (e.g., which TCI states, subarrays) for the first device to use for different modes or procedures (e.g., at a corresponding time) based on parameters that correspond to a full beam correspondence or no beam correspondence. For example, the parameters may be used for initial access, beam failure recovery, low power modes, or high temperature modes.

58 Claims, 18 Drawing Sheets

(56) References Cited

U.S. PATENT DOCUMENTS

| | | | |
|---|---|---|---|
| 8,503,322 | B2 | 8/2013 | Krishnamurthy et al. |
| 9,312,933 | B2 | 4/2016 | Zhang et al. |
| 9,363,683 | B2 | 6/2016 | Raghavan et al. |
| 9,520,973 | B2 | 12/2016 | Kim et al. |
| 9,806,777 | B1 | 10/2017 | Doostnejad et al. |
| 10,075,223 | B1 | 9/2018 | Pawar et al. |
| 10,425,901 | B2 | 9/2019 | Islam et al. |
| 10,462,796 | B2 | 10/2019 | Frenne et al. |
| 10,574,321 | B2 | 2/2020 | Nilsson et al. |
| 10,826,585 | B2 | 11/2020 | Bolotin et al. |
| 10,841,914 | B2 | 11/2020 | Liou et al. |
| 10,924,173 | B2 | 2/2021 | Bai et al. |
| 11,438,877 | B2 | 9/2022 | Luo et al. |
| 2006/0008275 | A1 | 1/2006 | Lacovara et al. |
| 2006/0039318 | A1 | 2/2006 | Oh et al. |
| 2011/0069633 | A1 | 3/2011 | Schmidt et al. |
| 2011/0255434 | A1* | 10/2011 | Ylitalo ............... H04B 7/0617 370/252 |
| 2012/0064841 | A1 | 3/2012 | Husted et al. |
| 2012/0140658 | A1 | 6/2012 | Kanzaki et al. |
| 2014/0235287 | A1 | 8/2014 | Maltsev et al. |
| 2014/0241446 | A1 | 8/2014 | Zhang et al. |
| 2014/0363166 | A1 | 12/2014 | Lacovara |
| 2015/0092621 | A1 | 4/2015 | Jalloul et al. |
| 2015/0349863 | A1 | 12/2015 | El Ayach et al. |
| 2016/0020876 | A1 | 1/2016 | Raghavan et al. |
| 2016/0044517 | A1 | 2/2016 | Raghavan et al. |
| 2016/0112173 | A1 | 4/2016 | Wang et al. |
| 2017/0005958 | A1 | 1/2017 | Frenkel et al. |
| 2017/0013630 | A1 | 1/2017 | Franz et al. |
| 2017/0117947 | A1 | 4/2017 | Petersson et al. |
| 2017/0195998 | A1* | 7/2017 | Zhang ............... H04W 52/365 |
| 2017/0294926 | A1 | 10/2017 | Islam et al. |
| 2017/0359826 | A1 | 12/2017 | Islam et al. |
| 2017/0364819 | A1 | 12/2017 | Yang |
| 2018/0062720 | A1* | 3/2018 | Islam ............... H04L 5/0053 |
| 2018/0063693 | A1* | 3/2018 | Chakraborty ......... H04W 48/16 |
| 2018/0138962 | A1 | 5/2018 | Islam et al. |
| 2018/0227094 | A1* | 8/2018 | Liu ............... H04W 72/046 |
| 2018/0227772 | A1* | 8/2018 | Yu ............... H04B 7/0617 |
| 2018/0249453 | A1 | 8/2018 | Nagaraja et al. |
| 2018/0249526 | A1* | 8/2018 | Nagaraja ............... H04W 24/08 |
| 2018/0278309 | A1 | 9/2018 | Raghavan et al. |
| 2018/0278320 | A1 | 9/2018 | Chendamarai et al. |
| 2019/0044596 | A1 | 2/2019 | Bolotin et al. |
| 2019/0053220 | A1 | 2/2019 | Zhang et al. |
| 2019/0081753 | A1 | 3/2019 | Jung et al. |
| 2019/0103908 | A1* | 4/2019 | Yu ............... H04B 7/0617 |
| 2019/0150161 | A1 | 5/2019 | Cheng et al. |
| 2019/0174385 | A1 | 6/2019 | Sang et al. |
| 2019/0190582 | A1 | 6/2019 | Guo et al. |
| 2019/0349863 | A1 | 11/2019 | Lim et al. |
| 2019/0393948 | A1 | 12/2019 | Zhao et al. |
| 2020/0015106 | A1* | 1/2020 | Lane ............... H04B 7/0695 |
| 2020/0028545 | A1 | 1/2020 | Koskela et al. |
| 2020/0029274 | A1* | 1/2020 | Cheng ............... H04W 76/28 |
| 2020/0059280 | A1* | 2/2020 | Thurfjell ............... H01Q 21/28 |
| 2020/0068644 | A1 | 2/2020 | Zhou et al. |
| 2020/0091978 | A1* | 3/2020 | Noh ............... H04B 7/0695 |
| 2020/0136708 | A1* | 4/2020 | Pan ............... H04B 7/0408 |
| 2020/0145079 | A1* | 5/2020 | Marinier ............... H04L 5/0051 |
| 2020/0145929 | A1 | 5/2020 | Ryu et al. |
| 2020/0178134 | A1 | 6/2020 | Yang et al. |
| 2020/0178261 | A1 | 6/2020 | Ioffe et al. |
| 2020/0220631 | A1 | 7/2020 | Onggosanusi et al. |
| 2020/0228190 | A1 | 7/2020 | Cirik et al. |
| 2020/0259618 | A1 | 8/2020 | Yang et al. |
| 2020/0259703 | A1 | 8/2020 | Cirik et al. |
| 2020/0260300 | A1 | 8/2020 | Cirik et al. |
| 2020/0314906 | A1 | 10/2020 | Goyal et al. |
| 2020/0351798 | A1* | 11/2020 | Ji ............... H04W 52/10 |
| 2020/0366348 | A1 | 11/2020 | Bolotin et al. |
| 2020/0374806 | A1 | 11/2020 | Manolakos et al. |
| 2020/0374960 | A1 | 11/2020 | Deenoo et al. |
| 2020/0383060 | A1* | 12/2020 | Park ............... H04W 52/242 |
| 2021/0021325 | A1 | 1/2021 | Davydov et al. |
| 2021/0022094 | A1 | 1/2021 | Luo et al. |
| 2021/0036741 | A1 | 2/2021 | Park et al. |
| 2021/0050898 | A1 | 2/2021 | Yu et al. |
| 2021/0068077 | A1 | 3/2021 | Raghavan et al. |
| 2021/0084672 | A1 | 3/2021 | Gulati et al. |
| 2021/0099958 | A1 | 4/2021 | Bae et al. |
| 2021/0105780 | A1 | 4/2021 | Jin et al. |
| 2021/0105860 | A1* | 4/2021 | Tsai ............... H04L 5/0023 |
| 2021/0111779 | A1 | 4/2021 | Kundargi et al. |
| 2021/0119688 | A1* | 4/2021 | Enescu ............... H04B 7/0695 |
| 2021/0127379 | A1 | 4/2021 | Harrebek et al. |
| 2021/0136598 | A1 | 5/2021 | Raghavan et al. |
| 2021/0144716 | A1 | 5/2021 | Choi et al. |
| 2021/0153085 | A1 | 5/2021 | Rahman et al. |
| 2021/0153209 | A1 | 5/2021 | Guan et al. |
| 2021/0159946 | A1 | 5/2021 | Raghavan et al. |
| 2021/0159966 | A1* | 5/2021 | Xi ............... H04L 5/0023 |
| 2021/0160850 | A1 | 5/2021 | Akkarakaran et al. |
| 2021/0160881 | A1* | 5/2021 | Rahman ............... H04W 72/23 |
| 2021/0226681 | A1 | 7/2021 | Raghavan et al. |
| 2021/0234586 | A1 | 7/2021 | Raghavan et al. |
| 2021/0234593 | A1 | 7/2021 | Raghavan et al. |
| 2021/0234597 | A1 | 7/2021 | Raghavan et al. |
| 2021/0234598 | A1 | 7/2021 | Raghavan et al. |
| 2021/0234602 | A1 | 7/2021 | Raghavan et al. |
| 2021/0234604 | A1 | 7/2021 | Raghavan et al. |
| 2021/0250940 | A1 | 8/2021 | Raghavan et al. |
| 2021/0251040 | A1 | 8/2021 | Tang et al. |
| 2021/0265741 | A1 | 8/2021 | Kenington |
| 2021/0329621 | A1 | 10/2021 | Raghavan |
| 2021/0359826 | A1 | 11/2021 | Wang et al. |
| 2021/0410094 | A1 | 12/2021 | Cui et al. |
| 2022/0006539 | A1 | 1/2022 | Sun et al. |
| 2022/0070823 | A1 | 3/2022 | Ma et al. |
| 2022/0086702 | A1 | 3/2022 | Wang et al. |
| 2022/0149924 | A1 | 5/2022 | Zhang et al. |
| 2022/0150717 | A1 | 5/2022 | Geng et al. |
| 2022/0200146 | A1* | 6/2022 | Du ............... H04B 7/0691 |
| 2022/0201505 | A1 | 6/2022 | Zhao et al. |
| 2022/0210810 | A1 | 6/2022 | Khoshnevisan et al. |
| 2022/0210814 | A1 | 6/2022 | Khoshnevisan |
| 2022/0345908 | A1 | 10/2022 | Takano et al. |
| 2023/0051329 | A1 | 2/2023 | Flordelis et al. |

FOREIGN PATENT DOCUMENTS

| | | | | |
|---|---|---|---|---|
| EP | 3167653 | A1 | 5/2017 | |
| EP | 3536101 | A1 | 9/2019 | |
| JP | 2001526510 | A | 12/2001 | |
| JP | 2013501480 | A | 1/2013 | |
| WO | WO-2014130893 | A2 | 8/2014 | |
| WO | WO-2017204546 | A1 | 11/2017 | |
| WO | WO-2018075205 | A1 | 4/2018 | |
| WO | WO-2018085709 | A1 | 5/2018 | |
| WO | WO-2018144844 | A1 * | 8/2018 | ............ H04B 7/0408 |
| WO | WO-2019014041 | A1 | 1/2019 | |
| WO | WO-2019029609 | A1 | 2/2019 | |
| WO | WO-2019140256 | A1 | 7/2019 | |
| WO | WO-2019192005 | A1 | 10/2019 | |
| WO | WO-2020020453 | A1 | 1/2020 | |
| WO | WO-2020096903 | A1 | 5/2020 | |
| WO | WO-2020101757 | A1 | 5/2020 | |
| WO | WO-2021041533 | A1 | 3/2021 | |

(56) References Cited

FOREIGN PATENT DOCUMENTS

| WO | WO-2021144114 A1 | 7/2021 |
|---|---|---|
| WO | WO-2021154737 A9 | 9/2021 |
| WO | WO-2022170622 A1 | 8/2022 |

OTHER PUBLICATIONS

International Search Report and Written Opinion—PCT/US2021/015056—ISA/EPO—May 10, 2021.
Mediatek Inc: "Discussion on UL Beam Management Procedure", 3GPP TSG RAN WG1 Meeting #88, 3GPP Draft; R1-1702731 Discussion on UL Beam Management Procedure Final, 3rd Generation Partnership Project (3GPP), Mobile Competence Centre ; 650, Route Des Lucioles; F-06921 Sophia-Antipolis Cedex, vol. RAN WG1, No. Athens, Greece; Feb. 13, 2017-Feb. 17, 2017, Feb. 12, 2017 (Feb. 12, 2017), XP051209878, 4 Pages, Retrieved from the Internet: URL:http://www.3gpp.org/ftp/Meetings_3GPP_SYNC/RAN1/Docs/ [retrieved on Feb. 12, 2017], sections 2-4.
Du, Y., et al., "Evaluation of PMI Feedback Schemes for MU-MIMO Pairing", IEEE Systems Journal, IEEE, US, vol. 4, No. 4, Dec. 1, 2010 (Dec. 1, 2010), XP011320688, pp. 505-510, ISSN: 1932-8184 p. 505.
Interdigital., et al., "Views on Panel Activation and Deactivation", 3GPP TSG RAN WG1 #98, 3GPP Draft; R1-1908233 Views on Panel Activation and Deactivation, 3rd Generation Partnership Project (3GPP), Mobile Competence Centre, 650, Route Des Lucioles, F-06921 Sophia-Antipolis Cedex, France, vol. RAN WG1, No. Prague, CZ; Aug. 26, 2019-Aug. 30, 2019, Aug. 16, 2019 (Aug. 16, 2019), 6 Pages, XP051764847, Retrieved from the Internet: URL: http://www.3gpp.org/ftp/tsg_ran/WG1_RL1/TSGR1_98/Docs/R1-1908233.zip, [retrieved on Aug. 16, 2019], Section 2, Section 3 (p. 5, gNB-Driven), figures 1-3.
Moderator (Samsung): "Moderator Summary for Multi-Beam Enhancement: Proposal Categorization", 3GPP TSG RAN WG1 #102-e, R1-2006985, e-Meeting, Aug. 17 2020-Aug. 28, 2020, 27 Pages, Aug. 25, 2020 (Aug. 25, 2020) sections 1-2, section 4.1, the whole document.
Raghavan, et al., "Antenna Placement and Performance Tradeoffs With Hand Blockage in Millimeter Wave Systems", IEEE, Apr. 2019 (Year: 2019), 16 Pages.
Ericsson: "FFSs Regarding Early Measurement Configurations", 3GPP Draft, 3GPP TSG-RAN WG2#106, R2-1907254—FFSS Regarding Early Measurement Configurations, 3rd Generation Partnership Project (3GPP), Mobile Competence Centre, 650, Route Des Lucioles, F-06921 Sophia-Antipolis Cedex, vol. RAN WG2, No. Reno, Nevada, USA, May 13, 2019-May 17, 2019 May 13, 2019 (May 13, 2019), XP051730695, pp. 1-4, Retrieved from the Internet: URL:http://www.3gpp.org/ftp/Meetings%5F3GPP%5FSYNC/RAN2/Docs/R2%2D1907254%2Ezip [retrieved on May 13, 2019] p. 3, paragraph 2.3 p. 4, paragraph 2.4.
Huawei et al., "Low Latency of SCell Activation", 3GPP Draft, 3GPP TSG RAN WG1 Meeting #96bis, R1-1903992, 3rd Generation Partnership Project (3GPP), Mobile Competence Centre, 650, Route Des Lucioles, F-06921 Sophia-Antipolis Cedex, France, vol. RAN WG1, No. Xi 'an, China, Apr. 8, 2019-Apr. 12, 2019, Apr. 7, 2019 (Apr. 7, 2019), XP051699403, 6 Pages, Retrieved from the Internet: URL:http://www.3gpp.org/ftp/Meetings%5F3GPP%5FSYNC/RAN1/Docs/R1%2D1903992%2Ezip [retrieved on Apr. 7, 2019] p. 2, paragraph 2.3—p. 3, paragraph 2.4 p. 4, paragraph 3 figures 3-5.
CATT: "Consideration on Multi-Beam Enhancements", 3GPP Draft; 3GPP TSG RAN WG1 Meeting #98, R1-1908603, 3rd Generation Partnership Project (3GPP), Mobile Competence Centre; 650, Route Des Lucioles; F-06921 Sophia-Antipolis Cedex; France, vol. RAN WG1, No. Prague, CZ; Aug. 26, 2019-Aug. 30, 2019, Aug. 17, 2019 (Aug. 17, 2019), XP051765211, 7 Pages, Retrieved from the Internet: URL: http://www.3gpp.org/ftp/tsg_ran/WG1_RL1/TSGR1_98/Docs/R1-1908603.zip [retrieved on Aug. 17, 2019], chapter 3; pp. 3,4, p. 2, paragraph section 2.1—p. 3, paragraph section 2.2.
Motorola Mobility, et al., "Power Control for Multi-Panel Uplink Transmission", 3GPP TSG RAN WG1 AH-1901, 3GPP Draft; R1-1900944-PC-EMIMO-OTHER-FINAL, 3rd Generation Partnership Project (3GPP), Mobile Competence Centre; 650, Route Des Lucioles; F-06921 Sophia-Antipolis Cedex; France, vol. RAN WG1, No. Taipei; Jan. 21, 2019-Jan. 25, 2019, 4 Pages, Jan. 20, 2019 (Jan. 20, 2019), XP051593788, Retrieved from the Internet: URL: http://www.3gpp.org/ftp/Meetings%5F3GPP%5FSYNC/RAN1/Docs/R1%2D1900944%2Ezip [retrieved on Jan. 20, 2019] p. 2, paragraph section 2.1—p. 3, paragraph section 2.2.
Samsung: "Discussions on NR UL Multi-Panel/Multi-TRP", 3GPP TSG RAN WG1 Meeting #90, 3GPP Draft; R1-1713579 UL Multi TRP Panel V0, 3rd Generation Partnership Project (3GPP), Mobile Competence Centre 650, Route Des Lucioles; F-06921 Sophia-Antipolis Cedex; France, vol. RAN WG1, No. Prague, Czechia; Aug. 21, 2017-Aug. 25, 2017, 3 Pages, Aug. 20, 2017 (Aug. 20, 2017), XP051316379, Retrieved from the Internet: URL: http://www.3gpp.org/ftp/Meetings_3GPP_SYNC/RAN1/Docs/ [retrieved on Aug. 20, 2017] p. 2-p. 3, figure 2.
Huawei, et al., "UL/DL BM for Latency/Overhead Reduction", 3GPP Draft, R1-1903974, 3GPP TSG RAN WG1 #96bis, 3rd Generation Partnership Project (3GPP), Mobile Competence Centre, 650, Route Des Lucioles, F-06921 Sophia-Antipolis Cedex, France, vol. RAN WG1, No. Xi'an, China, Apr. 8, 2019-Apr. 12, 2019, Apr. 7, 2019 (Apr. 7, 2019), XP051699387, 8 Pages, Retrieved from the Internet: URL:http://www.3gpp.org/ftp/Meetings%5F3GPP%5FSYNC/RAN1/Docs/R1%2D1903974%2Ezip [retrieved on Apr. 7, 2019] the Whole Document.
Lenovo, et al., "Discussion of Beam Failure Recovery for Carrier Aggregation", 3GPP Draft, 3GPP TSG RAN WG1 Meeting #92, R1-1804211_BFR, 3rd Generation Partnership Project (3GPP), Mobile Competence Centre, 650, Route Des Lucioles, F-06921 Sophia-Antipolis Cedex, France, vol. RAN WG1, No. Sanya, China, Apr. 16, 2018-Apr. 20, 2018, Apr. 6, 2018, XP051413160, 3 Pages, Retrieved from the Internet: URL:http://www.3gpp.org/ftp/tsg%5Fran/WG1%5FRL1/TSGR1%5F92b/Docs/, http://www.3gpp.org/ftp/tsg%5Fran/WG1%5FRL1/TSGR1%5F92b/Docs/, [retrieved on Apr. 6, 2018], p. 1, line 15-line 16 p. 2, line 6-line 16, the Whole Document.
Samsung: "Remaining Details on QCL", 3GPP Draft, 3GPP TSG RAN WG1 #90b, R1-1717634-QCL V2, 3rd Generation Partnership Project (3GPP), Mobile Competence Centre, 650, Route Des Lucioles, F-06921 Sophia-Antipolis Cedex, France, vol. RAN WG1, No. Prague, Czech Republic, Oct. 9, 2017-Oct. 13, 2017, Oct. 8, 2017 (Oct. 8, 2017), XP051340820, 9 Pages, Retrieved from the Internet: URL:http://www.3gpp.org/ftp/Meetings_3GPP_SYNC/RAN1/Docs/ retrieved on Oct. 8, 2017] p. 6-p. 7 p. 3.
Ali A., et al., "Spatial Covariance Estimation for Millimeter Wave Hybrid Systems using Out-of-Band Information", May 2019, Center for Transportation Research, pp. 1-14.
Jain I. K., "Millimeter Wave Beam Training: A Survey", arXiv, Sep. 2018, 2 Pages.
Zheng Z., et al., "Time of Arrival and Time Sum of Arrival Based NLOS Identification and Localization", IEEE 2012, 5 Pages.

\* cited by examiner

DYNAMIC MIXED MODE BEAM CORRESPONDENCE IN UPPER MILLIMETER WAVE BANDS

CROSS REFERENCE

The present Application for Patent claims the benefit of U.S. Provisional Patent Application No. 62/966,532 by RAGHAVAN et al., entitled "DYNAMIC MIXED MODE BEAM CORRESPONDENCE IN UPPER MILLIMETER WAVE BANDS," filed Jan. 27, 2020, assigned to the assignee hereof, and expressly incorporated by reference herein.

INTRODUCTION

The following relates to wireless communications, and more specifically to dynamic beam correspondence.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

SUMMARY

A method of wireless communications at a first device is described. The method may include transmitting, to a second device, a capability indicating a status for dynamic beam correspondence with the second device, transmission of the capability based on a first set of antenna elements being different from a second set of antenna elements, the first set of antenna elements used for downlink communications with the second device, and the second set of antenna elements used for uplink communications with the second device. In some cases, the method may then include receiving, from the second device, an indication of an operating mode to use for communications with the second device, the operating mode being based on the capability and communicating with the second device frequency band based on the received indication of the operating mode.

An apparatus for wireless communications at a first device is described. The apparatus may include a processor and memory coupled with the processor, the processor and memory configured to transmit, to a second device, a capability indicating a status for dynamic beam correspondence with the second device, transmission of the capability based on a first set of antenna elements being different from a second set of antenna elements, the first set of antenna elements used for downlink communications with the second device, and the second set of antenna elements used for uplink communications with the second device. In some cases, the processor and memory may then be configured to receive, from the second device, an indication of an operating mode to use for communications with the second device, the operating mode being based on the capability and to communicate with the second device based on the received indication of the operating mode.

Another apparatus for wireless communications at a first device is described. The apparatus may include means for transmitting, to a second device, a capability indicating a status for dynamic beam correspondence with the second device, transmission of the capability based on a first set of antenna elements being different from a second set of antenna elements, the first set of antenna elements used for downlink communications with the second device, and the second set of antenna elements used for uplink communications with the second device. In some cases, the apparatus may then include means for receiving, from the second device, an indication of an operating mode to use for communications with the second device, the operating mode being based on the capability and for communicating with the second device based on the received indication of the operating mode.

A non-transitory computer-readable medium storing code for wireless communications at a first device is described. The code may include instructions executable by a processor to transmit, to a second device, a capability indicating a status for dynamic beam correspondence with the second device, transmission of the capability based on a first set of antenna elements being different from a second set of antenna elements, the first set of antenna elements used for downlink communications with the second device, and the second set of antenna elements used for uplink communications with the second device. In some cases, the code may then include instructions executable by the processor to receive, from the second device, an indication of an operating mode to use for communications with the second device, the operating mode being based on the capability and to communicate with the second device based on the received indication of the operating mode.

In some examples of the method, apparatuses, and non-transitory computer-readable medium described herein, transmitting the capability may include operations, features, means, or instructions for transmitting, to the second device, a time-dependent status for the dynamic beam correspondence with the second device.

In some examples of the method, apparatuses, and non-transitory computer-readable medium described herein, the time-dependent status for the dynamic beam correspondence may include an indication of beam correspondence for a first transmission time interval (TTI), an indication of no beam correspondence for a second TTI, or a combination thereof.

In some examples of the method, apparatuses, and non-transitory computer-readable medium described herein, the time-dependent status may indicate a beam correspondence capability that changes for different TTIs.

In some examples of the method, apparatuses, and non-transitory computer-readable medium described herein, the different TTIs may include different symbols, slots, or subframes.

In some examples of the method, apparatuses, and non-transitory computer-readable medium described herein, transmitting the capability may include operations, features, means, or instructions for transmitting, to the second device, a first indication of beam correspondence for one or more first transmission configuration indication (TCI) states, a second indication of no beam correspondence for one or more second TCI states, or a combination thereof.

In some examples of the method, apparatuses, and non-transitory computer-readable medium described herein, the first indication of beam correspondence, the second indication of no beam correspondence, or both may be time-dependent.

In some examples of the method, apparatuses, and non-transitory computer-readable medium described herein, transmitting the capability may include operations, features, means, or instructions for transmitting, to the second device, an indication of no beam correspondence and for transmitting, to the second device, an amount of power savings, a reduction in temperature or temperature gradient, or both for the communications with the second device, where the amount of power savings, the reduction in temperature or temperature gradient, or both result from the lack of beam correspondence.

In some examples of the method, apparatuses, and non-transitory computer-readable medium described herein, receiving the indication of the operating mode may include operations, features, means, or instructions for receiving, from the second device, an indication to use one or more TCI states, one or more subarrays, or a combination thereof, where the one or more TCI states, the one or more subarrays, or the combination thereof may have full beam correspondence for the communications with the second device.

In some examples of the method, apparatuses, and non-transitory computer-readable medium described herein, the one or more TCI states, the one or more subarrays, or the combination thereof may be used for an initial access procedure, for a beam failure recovery procedure, or both.

In some examples of the method, apparatuses, and non-transitory computer-readable medium described herein, the one or more TCI states, the one or more subarrays, or the combination thereof may be used for a low power mode, a high temperature or temperature gradient mode, or both.

In some examples of the method, apparatuses, and non-transitory computer-readable medium described herein, the full beam correspondence includes a calibration adjusted same set of beam weights, antenna amplitudes, antenna phases, or a combination thereof that may be used for both a downlink beam and an uplink beam for the communications with the second device.

In some examples of the method, apparatuses, and non-transitory computer-readable medium described herein, the capability indicating the status for dynamic beam correspondence with the second device may include a mixed beam correspondence mode operation indication.

In some examples of the method, apparatuses, and non-transitory computer-readable medium described herein, the communications with the second device may occur on frequencies that may be greater than 24.25 gigahertz (GHz).

In some examples of the method, apparatuses, and non-transitory computer-readable medium described herein, the first device may be a UE or a customer premises equipment (CPE) in a wireless communications system, and the second device may be a base station, a CPE, a relay device, a router, a repeater, or an integrated access and backhaul (IAB) node in the wireless communications system.

A method of wireless communications at a second device is described. The method may include receiving, from a first device that is in communications with the second device, a capability indicating a status for dynamic beam correspondence between the first device and the second device. Additionally, the method may include transmitting, to the first device, an indication of an operating mode to use for communications with the second device, the operating mode based at least in part on the received capability. In some cases, the method may further include communicating with the first device based on the transmitted indication of the operating mode.

An apparatus for wireless communications at a second device is described. The apparatus may include a processor and memory coupled with the processor, the processor and memory configured to receive, from a first device that is in communications with the second device, a capability indicating a status for dynamic beam correspondence between the first device and the second device. Additionally, the processor and memory may be configured to transmit, to the first device, an indication of an operating mode to use for communications with the second device, the operating mode based at least in part on the received capability. In some cases, the processor and memory may be further configured to communicate with the first device band based on the transmitted indication of the operating mode.

Another apparatus for wireless communications at a second device is described. The apparatus may include means for receiving, from a first device that is in communications with the second device, a capability indicating a status for dynamic beam correspondence between the first device and the second device. Additionally, the apparatus may include means for transmitting, to the first device, an indication of an operating mode to use for communications with the second device, the operating mode based at least in part on the received capability. In some cases, the apparatus may further include means for communicating with the first device based on the transmitted indication of the operating mode.

A non-transitory computer-readable medium storing code for wireless communications at a second device is described. The code may include instructions executable by a processor to receive, from a first device that is in communications with the second device, a capability indicating a status for dynamic beam correspondence between the first device and the second device. Additionally, the code may include instructions executable by the processor to transmit, to the first device, an indication of an operating mode to use for communications with the second device, the operating mode based at least in part on the received capability. In some cases, the code may further include instructions executable by the processor to communicate with the first device based on the transmitted indication of the operating mode.

In some examples of the method, apparatuses, and non-transitory computer-readable medium described herein, receiving the capability may include operations, features, means, or instructions for receiving, from the first device, a time-dependent status for the dynamic beam correspondence between the first device and the second device, the time-dependent status indicating a beam correspondence capability that changes for different TTIs.

In some examples of the method, apparatuses, and non-transitory computer-readable medium described herein, the time-dependent status for the dynamic beam correspondence may include an indication of beam correspondence for a first TTI, an indication of no beam correspondence for a second TTI, or a combination thereof.

In some examples of the method, apparatuses, and non-transitory computer-readable medium described herein, the time-dependent status may indicate a beam correspondence capability that changes for different TTIs.

In some examples of the method, apparatuses, and non-transitory computer-readable medium described herein, the different TTIs may include different symbols, slots, or subframes.

In some examples of the method, apparatuses, and non-transitory computer-readable medium described herein, receiving the capability may include operations, features, means, or instructions for receiving, from the first device, a first indication of beam correspondence for one or more first TCI states, a second indication of no beam correspondence for one or more second TCI states, or a combination thereof.

In some examples of the method, apparatuses, and non-transitory computer-readable medium described herein, the first indication of beam correspondence, the second indication of no beam correspondence, or both may be time-dependent.

In some examples of the method, apparatuses, and non-transitory computer-readable medium described herein, receiving the capability may include operations, features, means, or instructions for receiving, from the first device, an indication of no beam correspondence and for receiving, from the first device, an amount of power savings, a reduction in temperature or temperature gradient, or both for the communications with the first device, where the amount of power savings, the reduction in temperature or temperature gradient, or both result from the lack of beam correspondence.

In some examples of the method, apparatuses, and non-transitory computer-readable medium described herein, transmitting the indication of the operating mode may include operations, features, means, or instructions for transmitting, to the first device, an indication to use one or more TCI states, one or more subarrays, or a combination thereof, where the one or more TCI states, the one or more subarrays, or the combination thereof may have full beam correspondence for the communications with the second device.

In some examples of the method, apparatuses, and non-transitory computer-readable medium described herein, the one or more TCI states, the one or more subarrays, or the combination thereof may be used for an initial access procedure, for a beam failure recovery procedure, or both.

In some examples of the method, apparatuses, and non-transitory computer-readable medium described herein, the one or more TCI states, the one or more subarrays, or the combination thereof may be used for a low power mode, a high temperature or temperature gradient mode, or both.

In some examples of the method, apparatuses, and non-transitory computer-readable medium described herein, the full beam correspondence may include a calibration adjusted same set of beam weights, antenna amplitudes, antenna phases, or a combination thereof that may be used for both a downlink beam and an uplink beam for the communications with the first device.

In some examples of the method, apparatuses, and non-transitory computer-readable medium described herein, the capability indicating the status for dynamic beam correspondence with the second device may include a mixed beam correspondence mode operation indication.

In some examples of the method, apparatuses, and non-transitory computer-readable medium described herein, the communications with the first device may occur on frequencies that may be greater than 24.25 GHz.

In some examples of the method, apparatuses, and non-transitory computer-readable medium described herein, the first device may be a UE or a CPE in a wireless communications system, and the second device may be a base station, a CPE, a relay device, a router, a repeater, or an IAB node in the wireless communications system.

DETAILED DESCRIPTION

Figure 1:
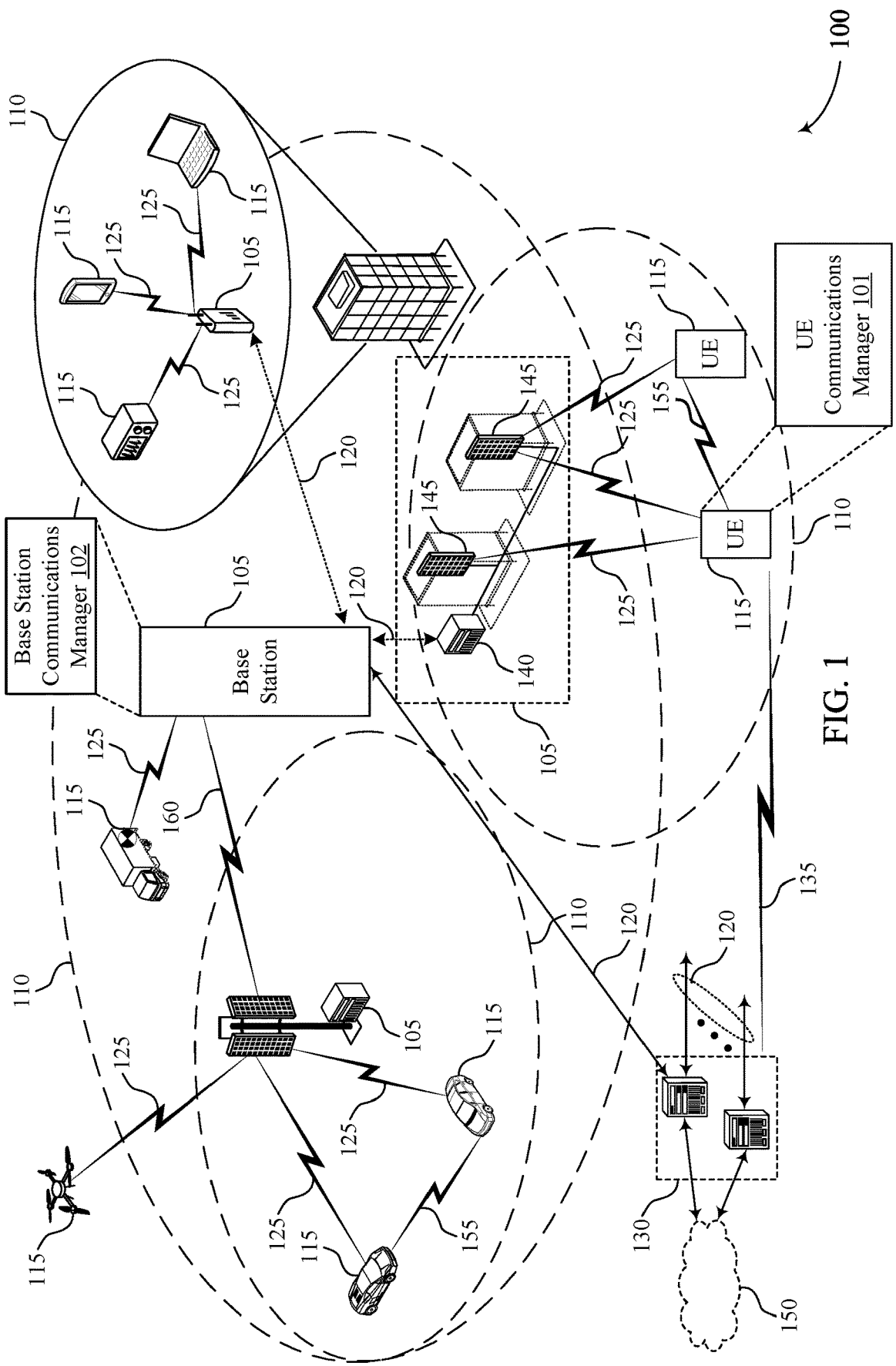
FIG. 1 illustrates an example of a system for wireless communications that supports dynamic mixed mode beam correspondence in upper millimeter wave (mmW) bands in accordance with aspects of the present disclosure.

In some deployments, wireless communications systems may operate in mmW frequency ranges (e.g., 24 GHz, 26 GHz, 28 GHz, 39 GHz, 52.6-71 GHz, etc.). Wireless communications at these frequencies may be associated with increased signal attenuation (e.g., path loss, penetration loss, blockage loss), which may be influenced by various factors, such as diffraction, propagation environment, density of blockages, material properties, etc. As a result, signal processing techniques, such as beamforming, may be used to coherently combine energy and overcome the path losses at these frequencies. Due to the increased amount of path, penetration, and blockage losses in mmW communications systems, transmissions between wireless devices (e.g., base stations, UEs, or additional types of wireless devices) may be beamformed. Moreover, a receiving device may use beamforming techniques to configure antenna(s), antenna array(s), antenna array module(s), or a combination thereof, such that transmissions are received in a directional manner.

In some deployments, communications in mmW frequencies may utilize what is referred to as frequency range 2 (FR2), corresponding to deployments in 24 GHz, 24.25 GHz, 26 GHz, 28 GHz, 39 GHz, etc. As demand for wireless communications increases, additional mmW frequencies may be desirable for some deployments, such as frequency range 4 (FR4) (e.g., or upper mmW bands) which may be associated with frequencies higher than the FR2 deployments (e.g., 52.6 GHz and beyond). In many FR2 deployments, wireless devices use antenna modules, and the antenna modules may include a number of antenna elements, such as, for example, an array of four antenna elements per module in a 4×1 array arrangement or a different array arrangement of a different number of antenna elements. Additionally or alternatively, upper mmW bands (e.g., frequencies higher than those used for FR2) may have shorter wavelengths, such that more antenna elements can be placed in the same physical aperture in FR4 than at FR2 (e.g., antennas or antenna elements for higher frequencies are shorter to match the shorter wavelengths, resulting in a higher number of smaller antenna elements being able to be placed in an antenna module or physical aperture). For example, an FR4 device may have multiple antenna modules that each contain a four 4×4 subarray or different array arrangements of different numbers of antenna elements (e.g., greater than a number of antennas used for lower frequencies, such as FR2). In some cases, different possible combinations of antenna elements across subarrays within an antenna module or across antenna modules may be feasible for use and management by a wireless device (e.g., a UE).

In some examples, a UE may use a same set of antenna elements for both transmitting uplink messages to a base station and for receiving downlink messages from the base station, where the same set of antenna elements may correspond to a single beam that is considered to have full beam correspondence. Additionally or alternatively, different arrays or subarrays of antenna elements may be used for downlink and for uplink communications, affecting beam correspondence (e.g., beams used for downlink communications may not point in the same direction as beams for the uplink communications based on the antenna elements being used for each of the uplink and downlink communications are on different areas of the overall antenna array). Additionally, the different subarrays may be dramatically different based on the higher number of antenna panels and elements used in FR4. As such, beam training may be performed separately for both uplink and for downlink, thereby doubling beam training overhead (e.g., doubling the amount of signaling used to determine which beams to use for which transmission direction).

Additionally or alternatively, based on using the different arrays/subarrays of antenna elements for downlink and for uplink communications, a UE (or any other device that communicates using mmW frequencies) may transmit a static indication of whether the UE has the capability to perform beam correspondence or not (e.g., a single bit to indicate the capability or support or not). However, with communicating in FR4 and using the different arrays or subarrays of antenna elements, beam correspondence may be available in some scenarios (e.g., in certain TTIs, for certain TCI states, for certain beams, etc.), so the beam correspondence may not merely be a "yes" or "no" indication. The beam correspondence support capability may be considered as partial, and, as such, new signaling may be needed to signal this partial capability and how to quantify the capability.

As described herein, a UE (e.g., or any other device that communicates using mmW, referred to as a first wireless device) may indicate a dynamic beam correspondence (e.g., mixed beam correspondence mode operation, mixed mode beam correspondence, dynamic mixed mode beam correspondence, etc.) for communications with a base station (e.g., or any other device that communicates using mmW, referred to as a second device or a second wireless device). In some cases, the dynamic beam correspondence may include different definitions or be declared in different ways. For example, the UE may declare the dynamic beam correspondence where the dynamic beam correspondence includes beam correspondence or a lack of beam correspondence in a time-dependent manner (e.g., the presence of beam correspondence changes for different instances in time or different TTIs, such as different symbols, slots, subframes, etc.). Additionally or alternatively, the UE may declare the dynamic beam correspondence where the dynamic beam correspondence includes beam correspondence for some TCI states (e.g., which are mapped to certain uplink or downlink subarrays of antenna elements, different sets of antenna elements, different sets of beam weights, etc.) and no beam correspondence for other TCI states (e.g., TCI states may be considered analogous to beams, beam indices, etc. created by a corresponding set of antenna elements or set of beam weights).

In some cases, the declaration of beam correspondence, no beam correspondence, or both for respective TCI states may be declared with a time-dependent manner as well (e.g., beam correspondence for a first set of antenna elements at a first instance in time, such as a time t0; beam correspondence for a second set of antenna elements at a second instance in time, such as a time t1; no beam correspondence for the first set of antenna elements at the second instance in time; etc.). Additionally or alternatively, the UE may declare no beam correspondence (e.g., for certain TCI states, different sets of antenna elements, different sets of beam weights, at certain instances in times, in different TTIs, or a combination thereof) along with associated power savings and thermal reductions (e.g., temperature or temperature gradient reductions) for downlink-uplink operation that result from the lack of beam correspondence.

Subsequently, based on the dynamic beam correspondence, the base station may identify which TCI states (e.g., sets of beam weights, beams, beam indices, etc.), subarrays of antennas (e.g., sets of antenna elements), etc. the base station wants the UE to use (e.g., operating modes) for different modes or procedures based on which TCI states, subarrays, etc. correspond to a full beam correspondence (e.g., for different times, TTIs, etc.). For example, the TCI states, subarrays, etc. that correspond to the full beam correspondence (e.g., an operating mode) may be used for initial access, beam failure recovery, etc. Additionally, the base station may identify and indicate for the UE to use certain TCI states, subarrays, etc. that have mixed or no beam correspondence (e.g., an operating mode) for low power modes, high temperature or temperature gradient modes, etc.

Aspects of the disclosure are initially described in the context of a wireless communications system. Additionally, aspects of the disclosure are illustrated through a wireless communication device with multiple antenna arrays, an additional wireless communications system, and a process flow. Aspects of the disclosure are further illustrated by and described with reference to apparatus diagrams, system diagrams, and flowcharts that relate to dynamic mixed mode beam correspondence in upper mmW bands.

FIG. 1 illustrates an example of a wireless communications system 100 that supports dynamic mixed mode beam correspondence in upper mmW bands in accordance with aspects of the present disclosure. The wireless communications system 100 may include one or more base stations 105, one or more UEs 115, and a core network 130. In some examples, the wireless communications system 100 may be an LTE network, an LTE-A network, an LTE-A Pro network, or an NR network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, repeater devices, CPE, IAB nodes, router devices, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links. In some examples, the one or more base stations 105 may provide backhaul connectivity between another base station 105 and core network 130 via a backhaul link 160 while acting as an IAB node.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays, routers, or CPE, as well as the base stations 105 and the network equipment including macro eNBs or gNBs, small cell eNBs or gNBs, IAB nodes, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or DFT-S-OFDM). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a TTI. In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, in the range of 300 MHz to 300 GHz. The region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support mmW communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions). In some cases, the above described techniques to identify a beam for communications between two wireless devices (e.g., such as between a UE 115 and a base station 105) may be part of a beam training procedure.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

UEs 115 may include one or more antenna modules that may include a relatively large number of antenna elements for mmW communications and may be an example of a first device (e.g., first wireless device) as discussed herein. A UE communications manager 101 may manage mmW communications and, in some cases, may identify a first set of antenna elements for downlink communications with a second device (e.g., a base station 105) and a second set of antenna elements for uplink communications with the second device. The UE communications manager 101 may then determine and transmit a capability (e.g., in a capability field) indicating a status for dynamic mixed mode beam correspondence (e.g., dynamic beam correspondence) with the second device based on the different antenna elements for the downlink and uplink communications. Subsequently, the UE communications manager 101 may receive an indication of an operating mode to use for communications with the second device based on the capability.

For example, the capability (e.g., dynamic beam correspondence indication) may indicate a time-dependent beam correspondence for the first device, static or semi-static beam correspondence for certain TCI states (e.g., for certain beams, for certain beam weights, for certain sets of antenna elements, etc.), time-dependent (across symbols, slots, minislots, subframes, etc.) beam correspondence for certain TCI states, or a combination thereof. Additionally or alternatively, the capability may indicate no beam correspondence and associated power savings and thermal reductions (unquantized or quantized to appropriate levels) that result from the lack of beam correspondence. Accordingly, the operating mode may indicate for the UE communications manager 101 (e.g., and the first device) to use certain TCI states, antenna subarrays, antenna elements, beams, etc. to perform different procedures with the second device. For example, the operating mode may indicate specific configurations for the UE communications manager 101 to use at certain times that correspond to a full beam correspondence, such as an initial access procedure, a beam failure recovery procedure, etc. Additionally or alternatively, the operating mode may indicate for the UE communications manager 101 to use a certain configuration (e.g., TCI states, antenna subarrays, antenna elements, beams, etc.) that have no beam correspondence to enable the first device to use or operate in a low power mode, an observed high temperature or temperature gradient mode, or both.

One or more of the base stations 105 may be an example of a second device (e.g., second wireless device) as discussed herein and may include a base station communications manager 102. The base station communications manager 102 may receive the capability (e.g., in the capability field) indicating the status for dynamic mixed mode beam correspondence (e.g., dynamic beam correspondence indication) at the first device. Accordingly, the base station communications manager 102 may then determine an operating mode for the first device to use based on the capability and may transmit an indication of this operating mode to the first device. As described above, the operating mode may indicate for the first device to use certain configurations (e.g., TCI states, antenna subarrays, antenna elements, beams, etc.) for different procedures (e.g., initial access procedures, beam failure recovery procedures, etc.), for different modes (e.g., low power modes, an observed high temperature or temperature gradient mode, etc.), or both, where certain configurations correspond to full beam correspondence or no beam correspondence based on the received capability.

Figure 2:
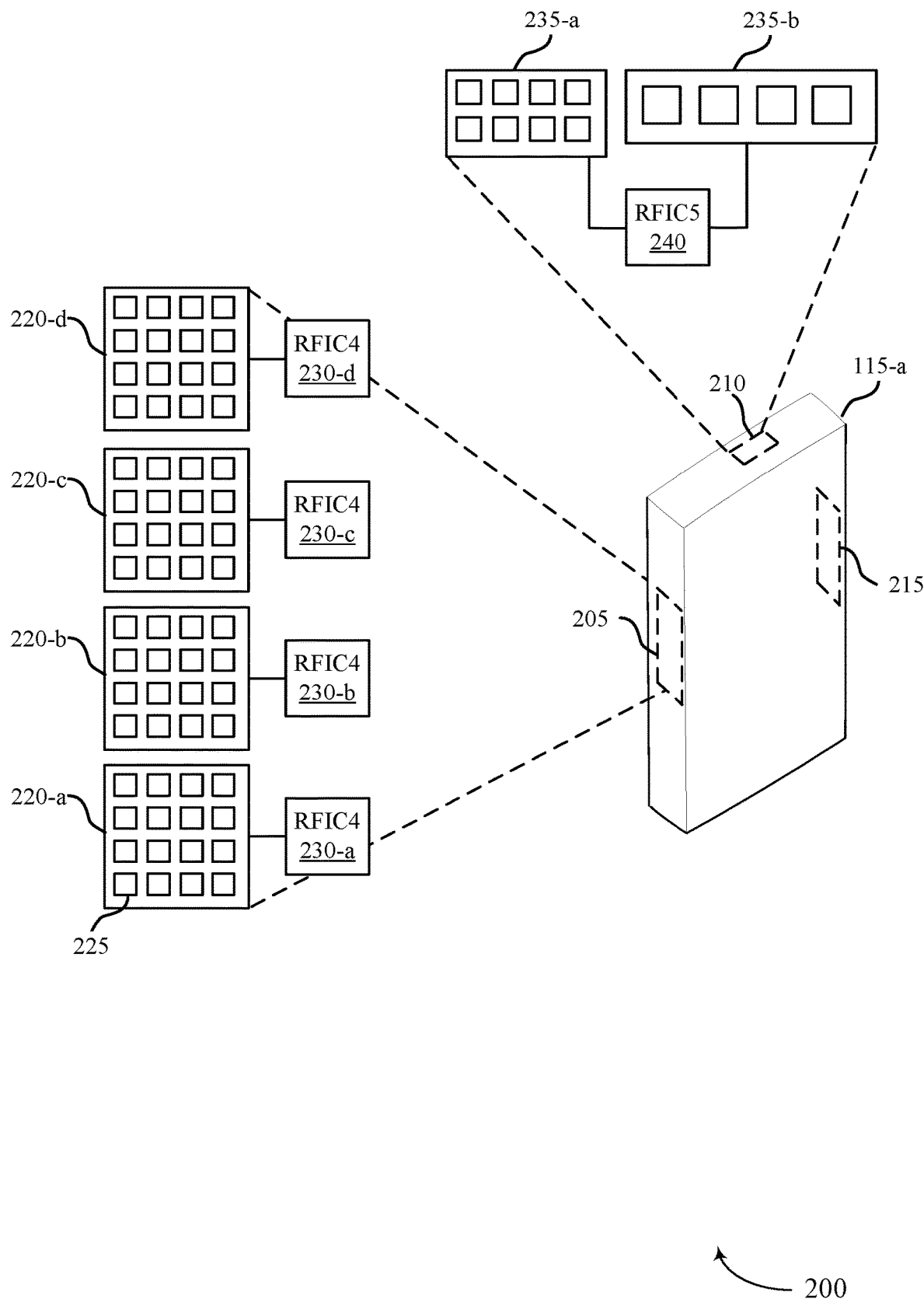
FIG. 2 illustrates an example of a wireless communication device with multiple antenna arrays that supports dynamic mixed mode beam correspondence in upper mmW bands in accordance with aspects of the present disclosure.

FIG. 2 illustrates an example of a wireless communication device with multiple antenna arrays 200 that supports dynamic mixed mode beam correspondence (e.g., dynamic beam correspondence) in upper mmW bands in accordance with aspects of the present disclosure. In some examples, wireless communication device with multiple antenna arrays 200 may implement aspects of wireless communications system 100. In this example, the wireless communication device may be a UE 115-a, although in other cases the wireless communication device may be a different device, such as a CPE, a relay device, a router, a repeater, or an IAB node.

In this example, the UE 115-a includes a number of different antenna modules, including a first antenna module 205, a second antenna module 210, and a third antenna module 215. Each of the antenna modules 205 through 215 may include a number of subarrays 220 of antenna elements. In FR2 (e.g., 24.25 to 52.6 GHz), each antenna module of the UE 115-a may include a 4×1 antenna patch subarray (e.g., four (4) antenna elements 225 in a single row). Additionally or alternatively, in FR4 (e.g., above 52.6 GHz), each antenna module may include an 8×2 antenna patch subarray (e.g., eight (8) antenna elements 225 in two (2) rows for 16 total antenna elements), a 16×4 antenna patch subarray (e.g., 16 antenna elements 225 in four (4) rows for 64 total antenna elements), or a different configuration with a higher number of antenna elements 225 than is found for FR2.

As shown in this example, the first antenna module 205 may include four subarrays 220, including a first subarray 220-a, a second subarray 220-b, a third subarray 220-c, and a fourth subarray 220-d (e.g., the four subarrays 220 may be considered an aggregate antenna panel or an aggregate patch subarray). Each subarray 220 in this example may include 16 individual antenna elements 225 arranged in a 4×4 array configuration (e.g., such that the aggregate antenna panel or the aggregate patch subarray includes 16×4 antenna elements 225 in a 16×4 antenna patch subarray). Each antenna element 225, in some cases, may be a patch antenna element configured to communicate in a high-band mmW deployment. In some cases, the spacing of antenna elements 225 within each subarray 220 may be configured to provide for efficient analog beamforming at wavelengths associated with high-band mmW communications (e.g., in FR4). Further, in this example, each subarray 220 may include an associated radio frequency integrated circuit (RFIC) 230.

In the example of FIG. 2, the second antenna module 210 also may include multiple subarrays 235, including a first subarray 235-a and a second subarray 235-b. In this example, the first subarray 235-a includes eight antenna elements arranged in a 4×2 array configuration, and the second subarray 235-b includes four antenna elements arranged in a 4×1 array configuration. In this case, a single RFIC (RFICS) 240 may be coupled with the subarrays 235, although multiple RFICs may be used or an RFIC may be shared with one or more other of the antenna modules 205 or 215. While the antenna module 210 is illustrated as having multiple subarrays 235 that are different sizes, other examples may have a same number of subarrays 235 with each subarray having a same size (e.g., four 4×4 antenna subarrays similarly as illustrated in the first antenna module 205). Techniques as discussed herein may be applied to any numbers of antenna modules 205, 210, or 215, any numbers of subarrays included in each antenna module, any numbers of antennas per subarray, or any combinations thereof.

As discussed herein, multiple RFICs 230 and associated antenna subarrays 220 may be used at different times by the wireless device. For example, in the case of FIG. 2 where the wireless device is UE 115-a, it may be desirable to operate using only a subset of the antenna modules 205, 210, or 215, using only a subset of antenna subarrays 220 and associated RFICs 230, using only a subset of antenna elements 225 within one or more subarrays 220, or any combinations thereof. Such operations may allow the UE 115-a to manage power consumption in order to reduce power used by radio frequency (RF) components, for example. In other cases, the UE 115-a may determine, in addition or alternatively to power consumption considerations, that one or more maximum permissible exposure (MPE) limitations, one or more thermal limitations, or combinations thereof, make it desirable to use only certain groups of antenna elements 225 of one or more subarrays 220. Thus, even though a relatively large number of antenna elements 225 are available at the UE 115-a, not all elements may be used at any particular instant in time.

For example, the UE 115-a may have a total of N antenna elements 225 across each of the different antenna modules 205, 210, or 215, and may choose K antenna elements 225 for communications, which results in $^{N}C_{K}$ possibilities, which can result in a relatively large number of combinations of different antenna elements 225. Thus, in some cases, the UE 115-a may select a relatively small list of antenna groups that are useful at a given time (e.g., based on power consumption, MPE consideration, thermal considerations, etc.). The UE 115-a may provide an indication of the selected antenna groups to a second device (e.g., a base station), and communications using one of the indicated antenna groups may be established.

Additionally, for certain lower frequency ranges (e.g., FR2, such as 24.25 to 52.6 GHz, or lower frequency ranges), it is assumed that there is an uplink-downlink beam correspondence. That is, a beam used for downlink communications (modulo some calibration changes that are the same for uplink and downlink) may be reused for uplink communications, so the same or similar beam weights may be used at the different antenna elements 225 of the UE 115-a for both the downlink and for the uplink communications. Additionally, the beam correspondence may also assume some tolerance for beam peak difference in uplink and downlink.

For FR4 (e.g., or upper mmW bands, systems beyond 52.6 GHz, etc.), the sets of antennas (e.g., the antenna elements 225, subarrays 220, etc.) for the downlink communications and for the uplink communications may be different (e.g., dramatically different such that the antenna elements are on different antenna modules, RFICs 230, etc.). For example, arrays, subarrays 220, antenna elements 225, etc. used for the uplink communications may be same or different as arrays, subarrays 220, antenna elements 225, etc. used for the downlink communications on same or different panels/modules.

That is, some subarrays 220 used for the uplink communications (e.g., uplink subarrays) may be on a same module/panel (e.g., pointing in a same direction) as subarrays 220 used for the downlink communications (e.g., downlink subarrays), or some of the subarrays 220 used for the uplink communications may be on different modules/panels or may be on the same module/panel as the subarrays 220 used for the downlink communications but pointing in different directions (e.g., relative to subarrays 220 used for the downlink communications). Thus, a beam learned for the arrays, subarrays 220, antenna elements 225, etc. used for the downlink communications with beam training (e.g., P-1-2-3 beam training) may not be useful for uplink transmissions (e.g., for identifying or refining a beam for the arrays, subarrays 220, antenna elements 225, etc. used for the uplink communications) in these scenarios.

In some cases, the different sets of antennas may be used for power reasons, performance reasons, RF/architecture reasons, or a combination thereof. For example, a higher number of antenna elements 225 may be used for the downlink communications than for the uplink communications (e.g., eight (8) antenna elements 225 used for the downlink communications vs. two (2) to four (4) antenna elements 225 used for the uplink communications) based on the downlink communications being less power intensive than the uplink communications. As such, a lesser number of antenna elements 225 may be used for the uplink communications to use less overall power since the uplink communications may expend more power (e.g., based on transmitting the communications out requiring more power than merely receiving communications on the higher number of antenna elements 225 for the downlink communications). Additionally, the antenna elements 225 used for the downlink communications may be considered to use less power (e.g., less power hungry) while the antenna elements 225 used for the uplink communications may use a power amplifier (e.g., to increase the power of uplink transmissions, such as increasing by 12 decibels (dB)), thereby increasing power consumption of the UE 115-a for the uplink communications.

Accordingly, this asymmetry (e.g., the use of different antenna elements 225 for uplink and for downlink communications) may potentially break the uplink-downlink beam correspondence at the UE 115-a (e.g., if same antenna elements 225 are used for the uplink and downlink communications, beam correspondence may then be supported). For example, any changes and/or beam weights applied to the sets of antennas for the downlink communications may not be applied to the sets of antennas for the uplink communications. In some cases, based on using the different arrays/subarrays of antenna elements 225 for downlink and for uplink communications, the UE 115-a may transmit a static indication of whether beam correspondence is capable or not. However, with communicating in FR4 and using the different arrays/subarrays of antenna elements, beam correspondence may be available in some scenarios (e.g., in certain TTIs, for certain TCI states, for certain beams, etc.), so the beam correspondence may not merely be a "yes" or "no" indication. The beam correspondence support capability may be considered as partial, and, as such, new signaling may be needed to signal this partial capability and how to quantify the capability.

As described herein, the UE 115-a may determine and transmit a capability indicating a status for dynamic mixed mode beam correspondence (e.g., dynamic beam correspondence) with the second device based on using different antenna elements for the downlink and uplink communications (e.g., in a capability field or a similar medium for indicating the dynamic mixed mode beam correspondence capability). Accordingly, the UE 115-a may then operate in a mode (e.g., an operating mode as indicated in a transmission by a second device, such as a base station 105) that uses certain TCI states, antenna subarrays, antenna elements, beams, etc. to perform different procedures with the second device based on the capability. Various examples of the contents of the capability and operating modes based on the capability are discussed with reference to FIGS. 3 and 4.

Figure 3:
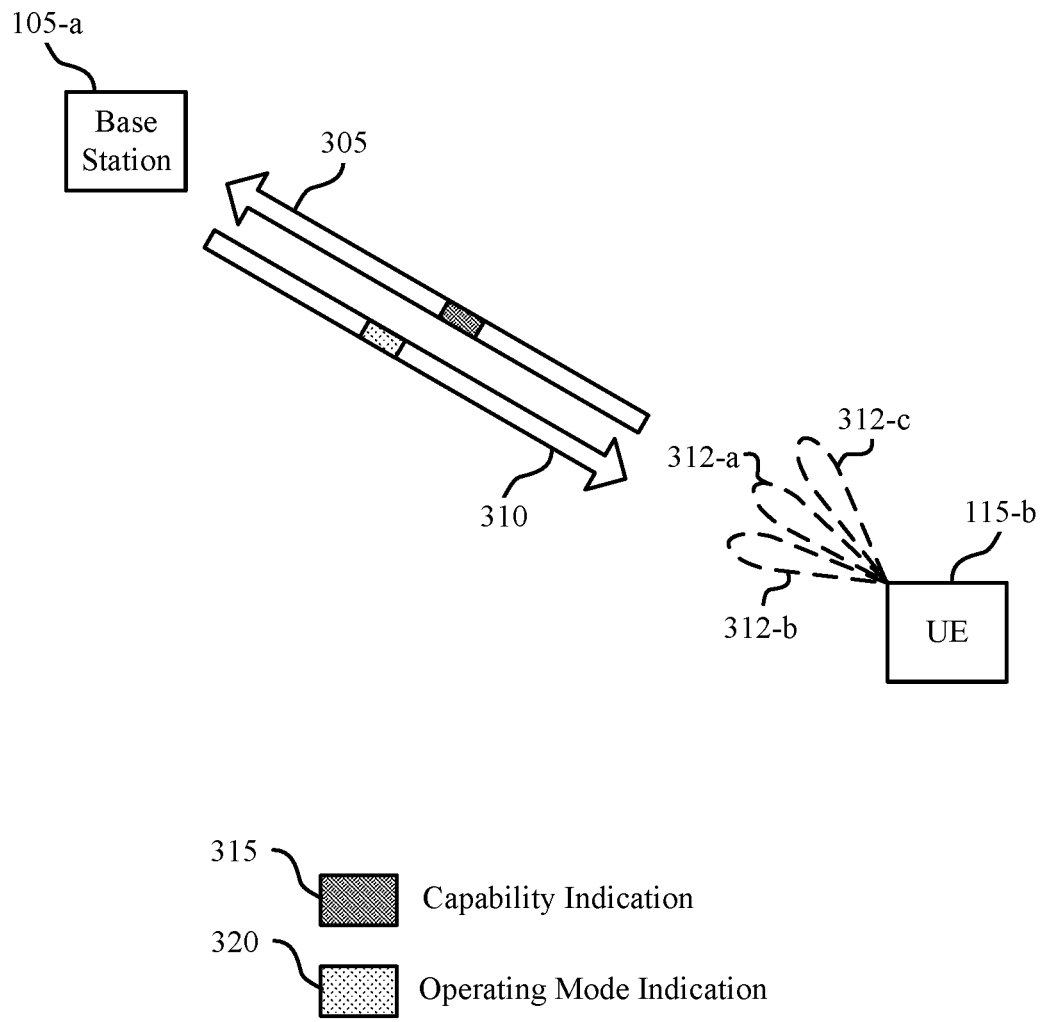
FIG. 3 illustrates an example of a wireless communications system that supports dynamic mixed mode beam correspondence in upper mmW bands in accordance with aspects of the present disclosure.

FIG. 3 illustrates an example of a wireless communications system 300 that supports dynamic mixed mode beam correspondence (e.g., dynamic beam correspondence) in upper mmW bands in accordance with aspects of the present disclosure. In some examples, wireless communications system 300 may implement aspects of wireless communications system 100. In some examples, the wireless communications system 300 may include a UE 115-b, and a base station 105-a which may be examples of UEs 115 and base stations 105 described with reference to FIGS. 1-2. Further, UE 115-b may be an example of a first device (e.g., a UE 115, a CPE, etc.), and the base station 105-a may be an example of a second device (e.g., a base station 105, a CPE, a relay, a router, a repeater, an IAB node, etc.). Additionally, the UE 115-b, the base station 105-a, or both may be considered high-tier devices that include sets of capabilities higher than mid- or low-tier devices. For example, the UE 115-b may have access to a higher number of bits (e.g., 200 or more) to indicate different capabilities of the UE 115-b based on being the high-tier device.

The UE 115-b and the base station 105-a may communicate using beamformed communications in which the UE 115-b transmits uplink communications 305 to the base station 105-a using one or more beams 312, and the base station 105-a transmits downlink communications 310 to the UE 115-b using beams. Additionally, the UE 115-b may use the one or more beams 312 to receive the downlink communications 310 from the base station 105-a. In some examples, the UE 115-b and the base station 105-a may communicate in an upper-band frequency range (for example, the FR2 that includes frequencies greater than 24.25 GHz or the FR4 that includes frequencies greater than 52.6 GHz). In some cases, the UE 115-b may include a relatively large number of antenna elements, which may be spread across one or more antenna subarrays and one or more antenna modules (e.g., based on communicating in the upper-band frequency range or FR4).

In some examples, the UE 115-b may use a same set of antenna elements for both transmitting uplink messages to the base station 105-a and for receiving downlink messages from the base station 105-b, where the same set of antenna elements may correspond to a single beam 312-a that is considered to have full beam correspondence. Additionally or alternatively, the UE 115-b may use different sets of antenna elements from the relatively large number of antenna elements for different transmission directions. For example, the UE 115-b may use a first set of antenna elements for receiving downlink communications (e.g., on a beam 312-b) and may use a second set of antenna elements for transmitting uplink communications (e.g., on a beam 312-c). Based on the different sets of antenna elements, no beam correspondence may be present between beams used for receiving the downlink communications (e.g., using the first set of antenna elements) and beams used for transmitting the uplink communications (e.g., using the second set of antenna elements), For example, the UE 115-b may use different uplink and downlink antenna arrays without beam correspondence between uplink and downlink. That is, a same beam or similar beams pointing in a same direction (e.g., full beam correspondence beams or mixed beam correspondence beams) may not be used for both the uplink communications and for the downlink communications (e.g., at the UE 115-b).

In some cases, beam correspondence may be a static UE capability in certain frequency ranges, such as FR2 (e.g., either the UE 115-b has it or not). For example, the beam correspondence may be indicated via one (1) bit (e.g., a binary field), where the UE 115-b transmits the bit (e.g., as a '1') to indicate "beam correspondence" (e.g., within a certain tolerance such as 2 dB margin between the array gains seen for downlink and uplink beams in the peak direction) or the bit (e.g., as a '0') to indicate "no beam correspondence" (e.g., which assumes no beam correspondence at all). In other frequency ranges (e.g., FR4), beam correspondence may be considered a dynamic capability. For example, the beam correspondence for the UE 115-b operating in upper-band frequency ranges may change dynamically over time (e.g., the UE 115-b has beam correspondence for a first slot, no beam correspondence for a next slot, etc.). Additionally, the beam correspondence may include a time-dependent capability that needs to be conveyed from the UE 115-b to the base station 105-a. For example, it may be desirable to exchange information or an indication of the beam correspondence for the UE 115-b as often as the UE 115-b identifies changes to its beam correspondence capability. There may be scenarios where the UE 115-b may declare lack of beam correspondence even when that capability is available to handle different UE specific issues such as optimizing power and thermal considerations. Accordingly, efficient techniques are desired for indicating scenarios where the beam correspondence is partial (e.g., a hybrid beam correspondence, dynamic beam correspondence, dynamic mixed mode beam correspondence, etc.) and for quantifying these partial beam correspondence capabilities.

As described herein, the UE 115-b may transmit a capability indication 315 to the base station 105-a for indicating a dynamic beam correspondence capability (e.g., a hybrid beam correspondence) of the UE 115-b. For example, the dynamic beam correspondence capability may be referred to as a dynamic mixed mode beam correspondence for the UE 115-b (e.g., to differentiate this dynamic beam correspondence from a static capability or definition as described above). In some cases, the capability indication 315 may include a two (2) or three (3) bit field to indicate the dynamic mixed mode beam correspondence (e.g., dynamic beam correspondence) for the UE 115-b (e.g., rather than the single bit used for the static beam correspondence indication). Additionally, while a two (2) or three (3) bit field to indicate the dynamic mixed mode beam correspondence is described above, higher-sized (e.g., greater than three (3) bits) or dynamic bit fields for the capability indication 315 may not be precluded in the above description and may be used to indicate the dynamic mixed mode beam correspondence.

The UE 115-b may declare the dynamic mixed mode beam correspondence in the capability indication 315 in multiple ways (e.g., with the multiple bits of the bit field). In some cases, the UE 115-b may declare beam correspondence or a lack of beam correspondence in a time-dependent manner (e.g., the beam correspondence changes across different TTIs, such as different symbols, slots, subframes, etc.). For example, the dynamic mixed mode beam correspondence may indicate a presence or absence of full beam correspondence in a time-dependent or dynamic manner across different symbols, slots, or subframes (e.g., for respective sets of beams, sets of antenna elements used to produce the beams, sets of beam weights used to produce the beams, or a combination thereof). In some cases, the full beam correspondence may indicate that a (calibration adjusted) same set of beam weights, antenna amplitudes, antenna phases, or a combination thereof may be used for both a downlink beam and an uplink beam of the UE 115-b. For example, full beam correspondence may indicate that a same beam (e.g., a same set of beam weights, antenna amplitudes, antenna phases, or a combination thereof) may be used for both uplink and downlink communications (e.g., for both a downlink beam and an uplink beam, such that the downlink beam and the uplink beam are the same beam) at the UE 115-b.

Additionally or alternatively, the UE 115-b may declare beam correspondence for some TCI states (e.g., beams or sets of beam weights which are mapped to certain uplink or downlink subarrays, different sets of antenna elements, etc., such that the beam correspondence may be declared for different beams, sets of beam weights, subarrays, sets of antenna elements, or a combination thereof) and no beam correspondence for certain other TCI states. In some cases, the beam correspondence or no beam correspondence for different TCI states may be indicated with a time-dependence aspect (e.g., beam correspondence for a first TCI state in a first TTI and no beam correspondence for the first TCI state in a next TTI, no beam correspondence for a second TCI state in the first TTI and beam correspondence for the second TCI state in the next TTI, etc.). For example, the dynamic mixed mode beam correspondence may indicate a presence of full beam correspondence for some TCI states and absence of full beam correspondence for some TCI states in a static manner or a time-dependent/dynamic manner. TCI states may indicate different beams, beam indices, etc. that the UE 115-b uses to communicate with the base station 105-a (e.g., for downlink communications and for uplink communications).

Additionally or alternatively, the UE 115-b may declare no beam correspondence (e.g., for certain TCI states, different sets of antenna elements, different sets of beam weights, etc.) and associated power savings and thermal or thermal gradient reductions (e.g., a reduction of UE skin temperature from 110° F. down to 105° F.) on downlink-uplink operations that result from the lack of beam correspondence. That is, the UE 115-b may identify that different potential advantages may be utilized (e.g., such as the power savings and thermal reductions) when operating with no beam correspondence and may indicate these advantages to the base station 105-b when indicating that no beam correspondence is supported in the capability indication 315. Such advantages may be declared in either a power and/or thermal quantized manner.

Upon UE declaration of the dynamic mixed mode beam correspondence received in the capability indication 315, the base station 105-a may respond with an operating mode indication 320 that can include different operating modes for the UE 115-b to use based on the dynamic mixed mode beam correspondence. For example, the base station 105-a may indicate in the operating mode indication 320 for the UE 115-b to use TCI states and subarrays that have full beam correspondence (e.g., an operating mode) for an initial access procedure. Additionally or alternatively, the base station 105-a may indicate in the operating mode indication 320 for the UE 115-b to use TCI states and subarrays that have full beam correspondence (e.g., an operating mode) for a beam failure recovery procedure. For example, based on the capability indication 315, the base station 105-a may identify certain TTIs where the UE 115-b has full beam correspondence for specific TCI states and antenna elements (e.g., antenna arrays, subarrays, etc.) and may indicate for the UE 115-b to use those specific TCI states and antenna elements (e.g., operating modes) to perform a procedure (e.g., initial access procedure, beam failure recovery procedure, etc.) based on when the procedure is occurring. Accordingly, the UE 115-b may perform the procedure using the corresponding beams (e.g., with specific TCI states, on the specific antenna elements, etc.) that have full beam correspondence (e.g., an operating mode).

Additionally or alternatively, the base station 105-a may indicate in the operating mode indication 320 for the UE 115-b to use TCI states and subarrays that have mixed beam correspondence (e.g., an operating mode that uses different uplink and downlink subarrays) for a low power mode and/or a high temperature mode (e.g., a high temperature or a high temperature gradient mode). For example, the base station 105-a may indicate for the UE 115-b to use TCI states and subarrays that have no beam correspondence for uplink and downlink communications (e.g., an operating mode) as part of the low power mode and/or high temperature mode (e.g., for the associated power savings and/or thermal reductions that come as a result of the lack of beam correspondence as indicated in the capability indication 315 as described above). For example, the low power mode may include when the UE 115-b has a low battery power (e.g., less than a threshold value for the battery power, such as less than 20% of charged battery power), such that the UE 115-b may attempt to conserve power to stay turned on where using beams with a lack of beam correspondence may assist in conserving power. Additionally, the high temperature mode (e.g., high temperature gradient mode) may include when the UE 115-b is operating at high temperatures (e.g., or the temperature of the UE 115-b has increased at a high rate), such that the UE 115-b is attempting to lower its temperature to prevent damage to itself that may occur due to high operating temperatures where using beams with a lack of beam correspondence may assist in reducing the temperature.

That is, the different operating modes may include the UE 115-b using beams (e.g., TCI states, subarrays used to form the beams, beam weights, etc.) indicated by the base station 105-b in the operating mode indication 320 with varying levels of beam correspondence (e.g., full beam correspondence, mixed beam correspondence, no beam correspondence, etc.) to perform different procedures (e.g., initial access procedure, beam failure recovery procedure, etc.) or to run in different modes (e.g., low power mode, high temperature mode, etc.). After receiving the operating mode indication 320, the UE 115-b and the base station 105-a may then communicate based on the operating mode indication 320 (e.g., using an operating mode that includes using indicated beams, TCI states, subarrays, beam weights, etc. that have full beam correspondence, mixed beam correspondence, no beam correspondence, etc.).

Figure 4:
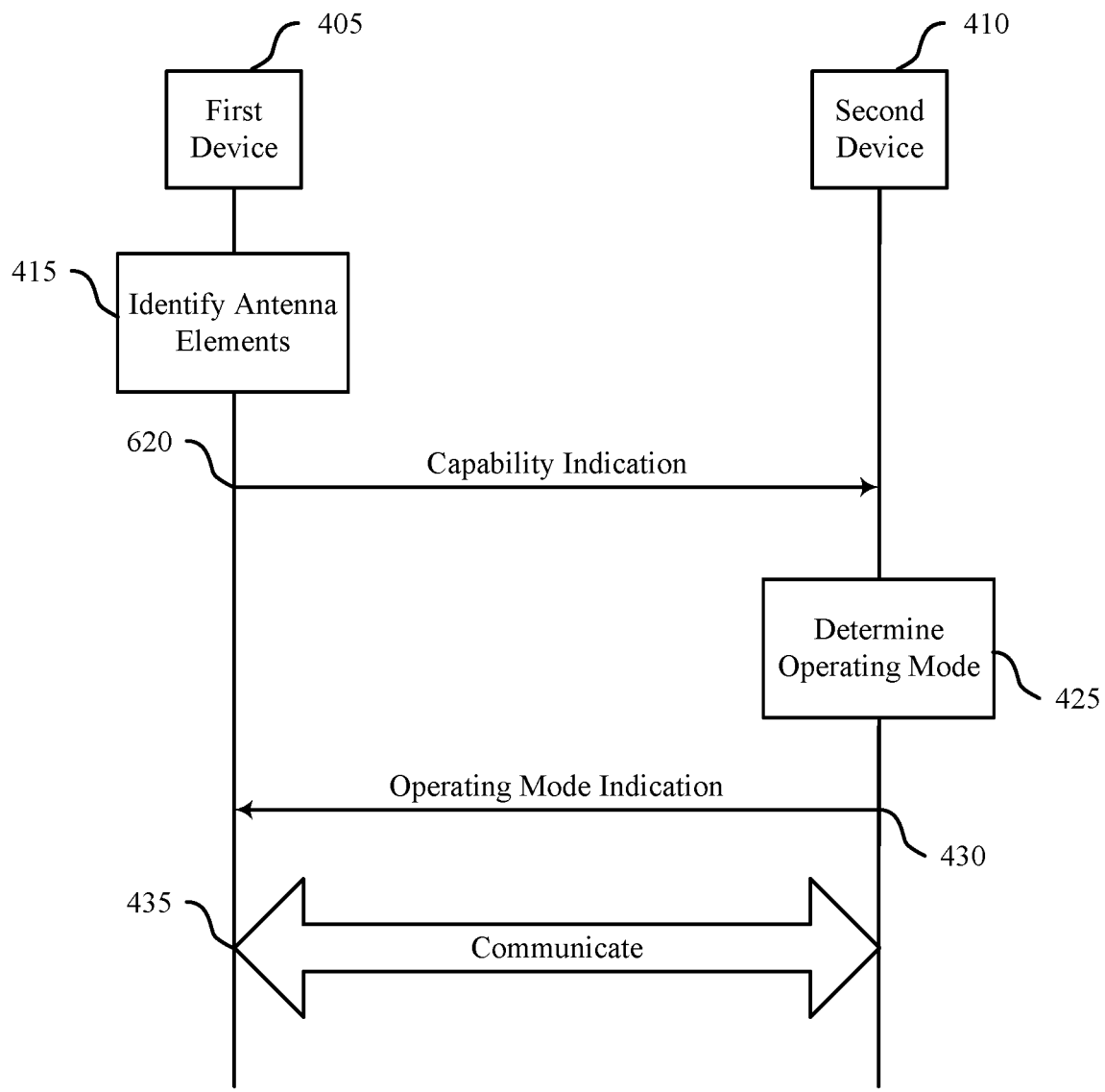
FIG. 4 illustrates an example of a process flow that supports dynamic mixed mode beam correspondence in upper mmW bands in accordance with aspects of the present disclosure.

FIG. 4 illustrates an example of a process flow 400 that supports dynamic mixed mode beam correspondence in upper mmW bands in accordance with aspects of the present disclosure. In some examples, process flow 400 may implement aspects of wireless communications systems 100 and 300. Process flow 400 may be implemented by a first device 405 and a second device 410 as described herein. Alternative examples of the following may be implemented, where some steps are performed in a different order than described or are not performed at all. In some cases, steps may include additional features not mentioned below, or further steps may be added.

At 415, the first device 405 may identify a first set of antenna elements for downlink communications with the second device 410 and a second set of antenna elements for uplink communications with the second device 410, where the first set of antenna elements is different from the second set of antenna elements. In some cases, the first device 405 may be a UE 115 or a CPE in a wireless communications system, and the second device 410 may be a base station 105, a CPE, a relay device, a router, a repeater, or an IAB node in the wireless communications system.

At 420, the first device 405 may transmit, to the second device 410, a capability indicating a status for dynamic mixed mode beam correspondence (e.g., dynamic beam correspondence) with the second device 410, where transmission of the capability is based on the first set of antenna elements being different from the second set of antenna elements. For example, the capability indicating the status for dynamic mixed mode beam correspondence with the second device may be a mixed beam correspondence mode operation indication (e.g., dynamic beam correspondence indication).

In some cases, the first device 405 may transmit, to the second device 410, a time-dependent status for the dynamic mixed mode beam correspondence with the second device 410, where the time-dependent status indicates a beam correspondence capability that changes for different TTIs. For example, the time-dependent status for the dynamic mixed mode beam correspondence may include an indication of beam correspondence for a first TTI, an indication of no beam correspondence for a second TTI, or a combination thereof. Additionally, the different TTIs may include different symbols, slots, or subframes.

Additionally or alternatively, when transmitting the capability, the first device 405 may transmit, to the second device 410, a first indication of beam correspondence for one or more first TCI states, a second indication of no beam correspondence for one or more second TCI states, or a combination thereof. In some cases, the first indication of beam correspondence, the second indication of no beam correspondence, or both may be time-dependent.

Additionally or alternatively, when transmitting the capability, the first device 405 may transmit, to the second device 410, an indication of no beam correspondence and may transmit (e.g., with the indication of no beam correspondence) an amount of power savings, a reduction in temperature or temperature gradient, or both for the communications with the second device 410, where the amount of power savings, the reduction in temperature or temperature gradient, or both result from the lack of beam correspondence.

At 425, the second device 410 may determine an operating mode for communications with the first device 405 based on the received capability.

At 430, the first device 405 may receive, from the second device 410, an indication of an operating mode to use for communications with the second device 410, the operating mode being based on the capability. For example, when receiving the indication of the operating mode, the first device 405 may receive, from the second device 410, an indication to use one or more TCI states, one or more subarrays, or a combination thereof (e.g., an operating mode), where the one or more TCI states, the one or more subarrays, or the combination thereof have full beam correspondence for the communications with the second device 410. In some cases, the one or more TCI states, the one or more subarrays, or the combination thereof may be used for an initial access procedure, for a beam failure recovery procedure, or both. Additionally or alternatively, the one or more TCI states, the one or more subarrays, or the combination thereof (e.g., an operating mode) may be used for a low power mode, a high temperature or temperature gradient mode, or both (e.g., if the one or more TCI states, the one or more subarrays, or the combination thereof have no beam correspondence). In some cases, the full beam correspondence may include a calibration adjusted same set of beam weights, antenna amplitudes, antenna phases, or a combination thereof that are used for both a downlink beam and an uplink beam for the communications with the second device 410.

At 435, the first device 405 may communicate with the second device 410 (e.g., via a mmW frequency band) based on the received indication of the operating mode. In some cases, the communications between the first device 405 and the second device 410 may occur on frequencies that are greater than 24.25 GHz.

Figure 5:
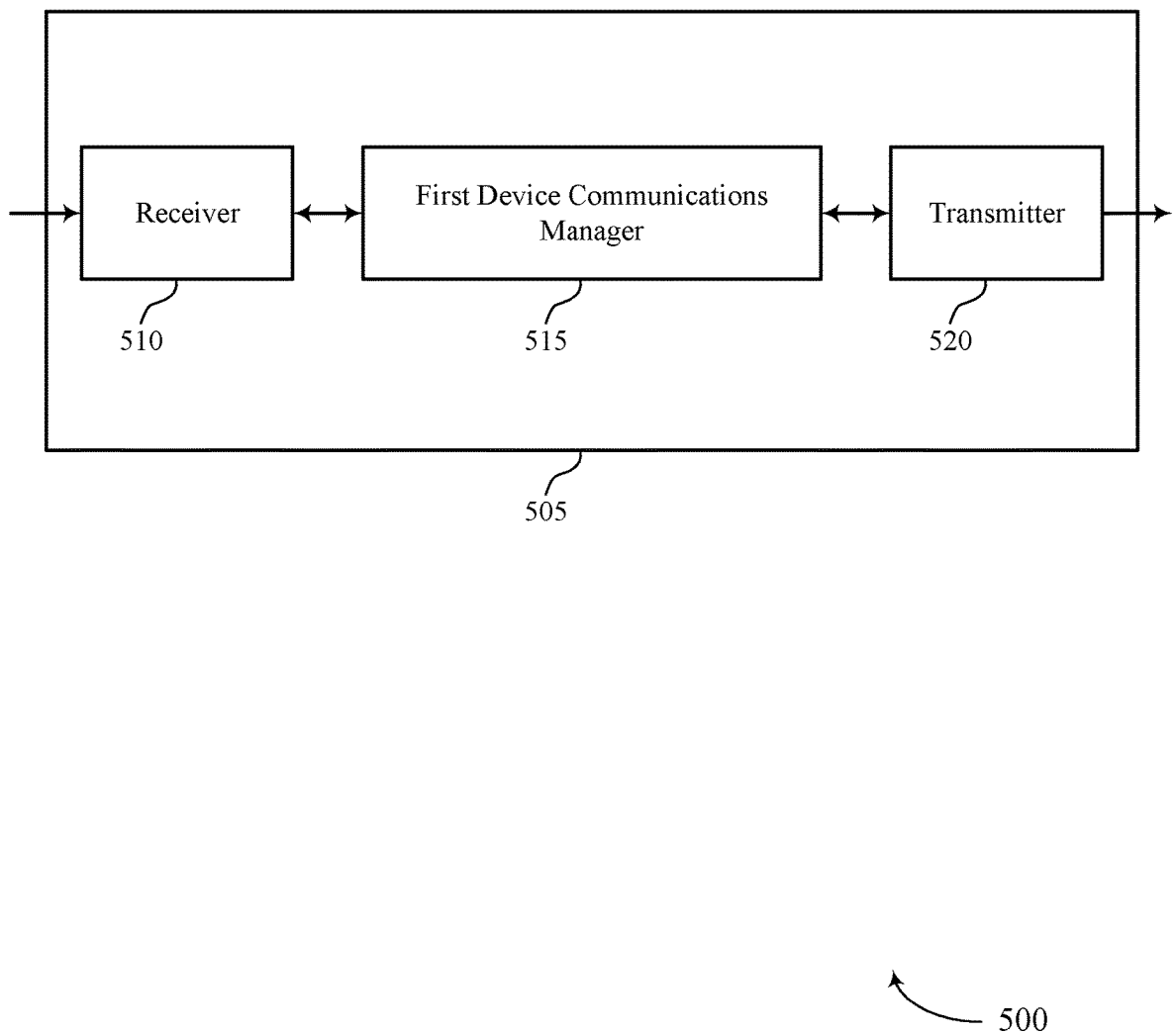
FIGS. 5 and 6 show block diagrams of devices that support dynamic mixed mode beam correspondence in upper mmW bands in accordance with aspects of the present disclosure.

FIG. 5 shows a block diagram 500 of a device 505 that supports dynamic mixed mode beam correspondence in upper mmW bands in accordance with aspects of the present disclosure. The device 505 may be an example of aspects of a first device (e.g., a UE 115, a CPE, etc.) as described herein. The device 505 may include a receiver 510, a first device communications manager 515 (e.g., which may be an example of a UE communications manager 101 as described above with reference to FIG. 1), and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to dynamic mixed mode beam correspondence in upper mmW bands, etc.). Information may be passed on to other components of the device 505. The receiver 510 may be an example of aspects of the transceiver 820 described with reference to FIG. 8. The receiver 510 may utilize a single antenna or a set of antennas.

The first device communications manager 515 may transmit, to a second device, a capability indicating a status for dynamic beam correspondence with the second device, transmission of the capability based on a first set of antenna elements being different from a second set of antenna elements, the first set of antenna elements used for downlink communications with the second device, and the second set of antenna elements used for uplink communications with the second device. Subsequently, the first device communications manager 515 may receive, from the second device, an indication of an operating mode to use for communications with the second device, the operating mode being based on the capability. Accordingly, the first device communications manager 515 may communicate with the second device based on the received indication of the operating mode. The first device communications manager 515 may be an example of aspects of the first device communications manager 810 described herein.

In some examples, the first device communications manager 515 as described herein may be implemented to realize one or more potential advantages. For example, by signaling the capability that indicates the dynamic beam correspondence, the second device may identify specific TCI states, antenna subarrays, etc. for the first device to use to perform certain procedures/modes at specific times based on the dynamic beam correspondence. As such, the first device may use more efficient configurations (e.g., TCI states, beams, antenna elements, etc.) to perform the procedures (e.g., initial access, beam failure recovery, etc.) and have a higher chance of successfully performing the procedures a first time, thereby increasing reliability that the procedure is successful rather than performing the procedures with less optimal configurations that have a higher chance of failing.

The first device communications manager 515 may be an example of means for performing various aspects of indicating dynamic beam correspondence (e.g., dynamic mixed mode beam correspondence) as described herein. The first device communications manager 515, or its sub-components, may be implemented in hardware (e.g., in communications management circuitry). The circuitry may comprise one or more of a processor, a digital signal processor (DSP), an application-specific integrated circuit (ASIC), a-programmable gate array (FPGA) or other programmable logic device, discrete gate or transistor logic, discrete hardware components, or any combination thereof designed to perform the functions described in the present disclosure.

In another implementation, the first device communications manager 515, or its sub-components, may be implemented in code (e.g., as communications management software or firmware) executed by a processor, or any combination thereof. If implemented in code executed by a processor, the functions of the first device communications manager 515, or its sub-components may be executed by a general-purpose processor, a DSP, an ASIC, an FPGA or other programmable logic device.

In some examples, the first device communications manager 515 may be configured to perform various operations (e.g., transmitting, receiving, communicating) using or otherwise in cooperation with the receiver 510, the transmitter 520, or both.

The first device communications manager 515, or its sub-components, may be physically located at various positions, including being distributed such that portions of functions are implemented at different physical locations by one or more physical components. In some examples, the first device communications manager 515, or its sub-components, may be a separate and distinct component in accordance with various aspects of the present disclosure. In some examples, the first device communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
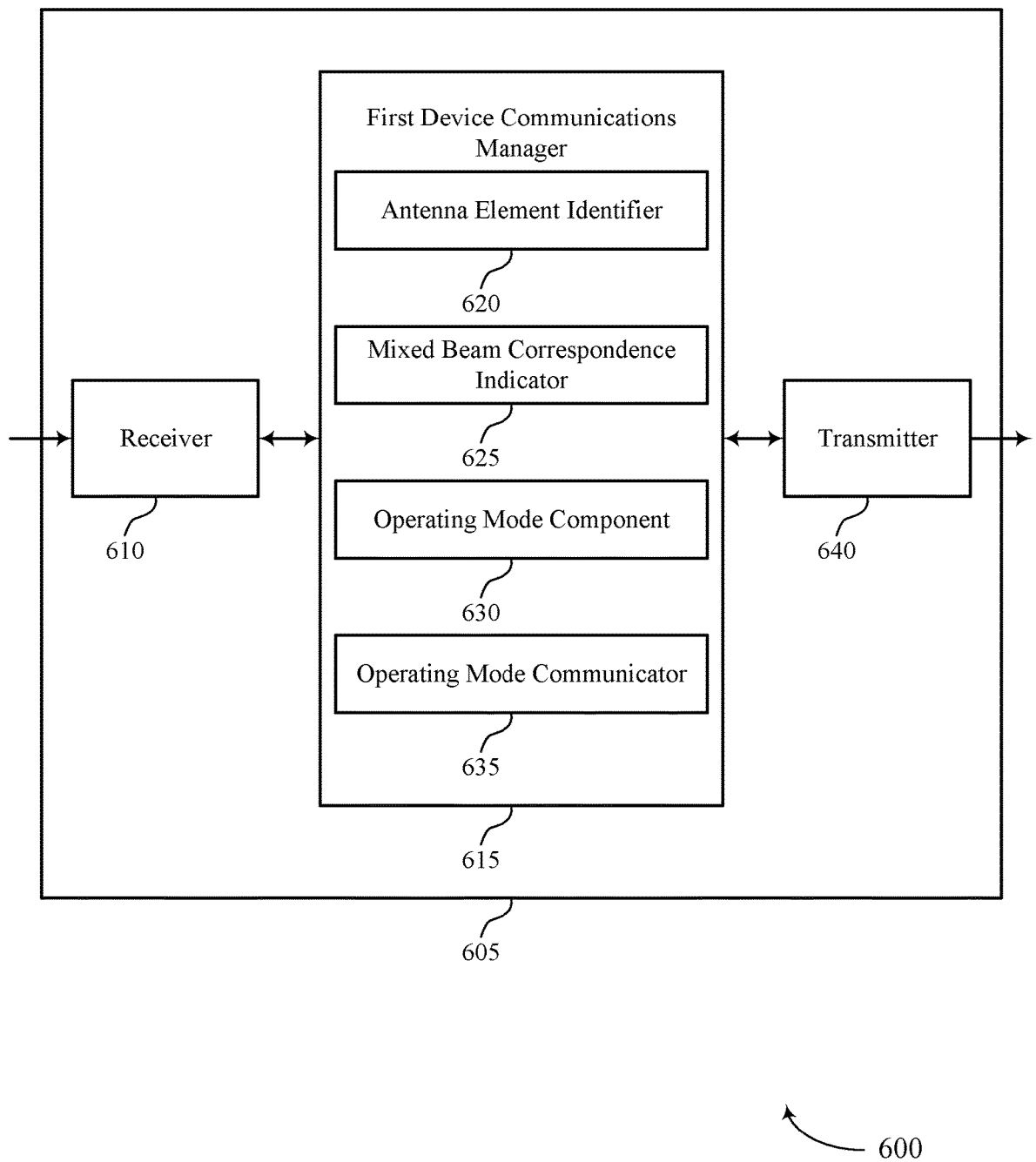

FIG. 6 shows a block diagram 600 of a device 605 that supports dynamic mixed mode beam correspondence in upper mmW bands in accordance with aspects of the present disclosure. The device 605 may be an example of aspects of a device 505 or a first device (e.g., a UE 115, a CPE, etc.) as described herein. The device 605 may include a receiver 610, a first device communications manager 615, and a transmitter 640. The device 605 may also include a processor. Each of these components may be in communication with one another (e.g., via one or more buses).

The receiver 610 may receive information such as packets, user data, or control information associated with various information channels (e.g., control channels, data channels, and information related to dynamic mixed mode beam correspondence in upper mmW bands, etc.). Information may be passed on to other components of the device 605. The receiver 610 may be an example of aspects of the transceiver 820 described with reference to FIG. 8. The receiver 610 may utilize a single antenna or a set of antennas.

The first device communications manager 615 may be an example of aspects of the first device communications manager 515 as described herein. The first device communications manager 615 may include an antenna element identifier 620, a mixed beam correspondence indicator 625, an operating mode component 630, and an operating mode communicator 635. The first device communications manager 615 may be an example of aspects of the first device communications manager 810 described herein.

The antenna element identifier 620 may identify a first set of antenna elements for downlink communications with a second device and a second set of antenna elements for uplink communications with the second device, the first set of antenna elements being different from the second set of antenna elements.

The mixed beam correspondence indicator 625 may transmit, to the second device, a capability indicating a status for dynamic beam correspondence with the second device, transmission of the capability based on the first set of antenna elements being different from the second set of antenna elements.

The operating mode component 630 may receive, from the second device, an indication of an operating mode to use for communications with the second device, the operating mode being based on the capability.

The operating mode communicator 635 may communicate with the second device (e.g., via a mmW frequency band) based on the received indication of the operating mode.

Based on techniques for determining and transmitting the capability indicating the status for dynamic beam correspondence with the second device, a processor of the first device (e.g., controlling the receiver 610, the transmitter 640, or the transceiver 820 as described with reference to FIG. 8) may decrease latency and signaling overhead that would result from performing different procedures (e.g., initial access, beam failure recovery, etc.) multiple times based on using less efficient or less optimal configurations (e.g., TCI states, antenna arrays/subarrays, etc. that have no beam correspondence, for example, at a given time). Additionally, by performing the procedures based on the received operating mode indication, the processor of the first device may then save power by performing the procedure with an efficient configuration as determined by the second device based on the operating mode (e.g., the first device may not have to perform the procedure multiple times since a first time has a higher chance of success based on the dynamic beam correspondence). In some cases, the processor may also save power and or implement thermal reductions for the first device based on the received operating mode indication.

The transmitter 640 may transmit signals generated by other components of the device 605. In some examples, the transmitter 640 may be collocated with a receiver 610 in a transceiver module. For example, the transmitter 640 may be an example of aspects of the transceiver 820 described with reference to FIG. 8. The transmitter 640 may utilize a single antenna or a set of antennas.

Figure 7:
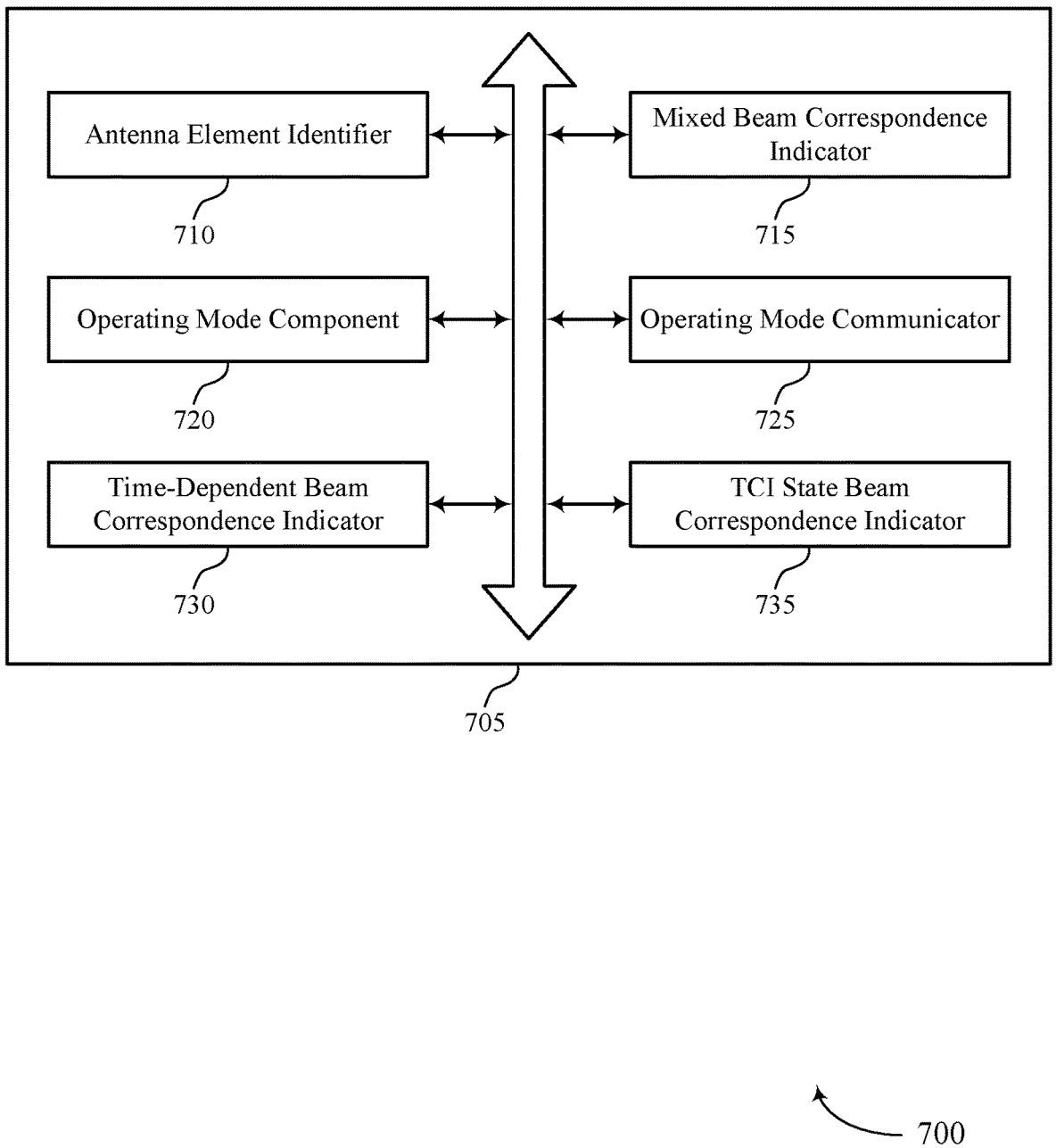
FIG. 7 shows a block diagram of a first device communications manager that supports dynamic mixed mode beam correspondence in upper mmW bands in accordance with aspects of the present disclosure.

FIG. 7 shows a block diagram 700 of a first device communications manager 705 that supports dynamic mixed mode beam correspondence in upper mmW bands in accordance with aspects of the present disclosure. The first device communications manager 705 may be an example of aspects of a first device communications manager 515, a first device communications manager 615, or a first device communications manager 810 described herein. The first device communications manager 705 may include an antenna element identifier 710, a mixed beam correspondence indicator 715, an operating mode component 720, an operating mode communicator 725, a time-dependent beam correspondence indicator 730, and a TCI state beam correspondence indicator 735. Each of these modules may communicate, directly or indirectly, with one another (e.g., via one or more buses).

The antenna element identifier 710 may identify a first set of antenna elements for downlink communications with a second device and a second set of antenna elements for uplink communications with the second device, the first set of antenna elements being different from the second set of antenna elements. In some cases, the first device may be a UE or a CPE in a wireless communications system, and the second device may be a base station, a CPE, a relay device, a router, a repeater, or an IAB node in the wireless communications system.

The mixed beam correspondence indicator 715 may transmit, to the second device, a capability indicating a status for dynamic beam correspondence with the second device, transmission of the capability based on the first set of antenna elements being different from the second set of antenna elements. In some examples, the mixed beam correspondence indicator 715 may transmit, to the second device, an indication of no beam correspondence and may transmit, to the second device, an amount of power savings, a reduction in temperature or temperature gradient, or both for the communications with the second device, where the amount of power savings, the reduction in temperature or temperature gradient, or both result from the lack of beam correspondence. In some cases, the capability indicating the status for dynamic beam correspondence with the second device may include a mixed beam correspondence mode operation indication.

The operating mode component 720 may receive, from the second device, an indication of an operating mode to use for communications with the second device, the operating mode being based on the capability. For example, the operating mode component 720 may receive, from the second device, an indication to use one or more TCI states, one or more subarrays, or a combination thereof, where the one or more TCI states, the one or more subarrays, or the combination thereof have full beam correspondence for the communications with the second device. In some cases, the one or more TCI states, the one or more subarrays, or the combination thereof are used for an initial access procedure, for a beam failure recovery procedure, or both. Additionally or alternatively, the one or more TCI states, the one or more subarrays, or the combination thereof are used for a low power mode, a high temperature or temperature gradient mode, or both. In some cases, the full beam correspondence may include a calibration adjusted same set of beam weights, antenna amplitudes, antenna phases, or a combination thereof that are used for both a downlink beam and an uplink beam for the communications with the second device.

The operating mode communicator 725 may communicate with the second device (e.g., via a mmW frequency band) based on the received indication of the operating mode. In some cases, the communications with the second device may occur on frequencies that are greater than 24.25 GHz.

The time-dependent beam correspondence indicator 730 may transmit, to the second device, a time-dependent status for the dynamic beam correspondence with the second device. In some cases, the time-dependent status for the dynamic beam correspondence may include an indication of beam correspondence for a first TTI, an indication of no beam correspondence for a second TTI, or a combination thereof. Additionally, the time-dependent status may indicate a beam correspondence capability that changes for different TTIs. For example, the different TTIs may include different symbols, slots, or subframes.

The TCI state beam correspondence indicator 735 may transmit, to the second device, a first indication of beam correspondence for one or more first TCI states, a second indication of no beam correspondence for one or more second TCI states, or a combination thereof. In some cases, the first indication of beam correspondence, the second indication of no beam correspondence, or both may be time-dependent.

Figure 8:
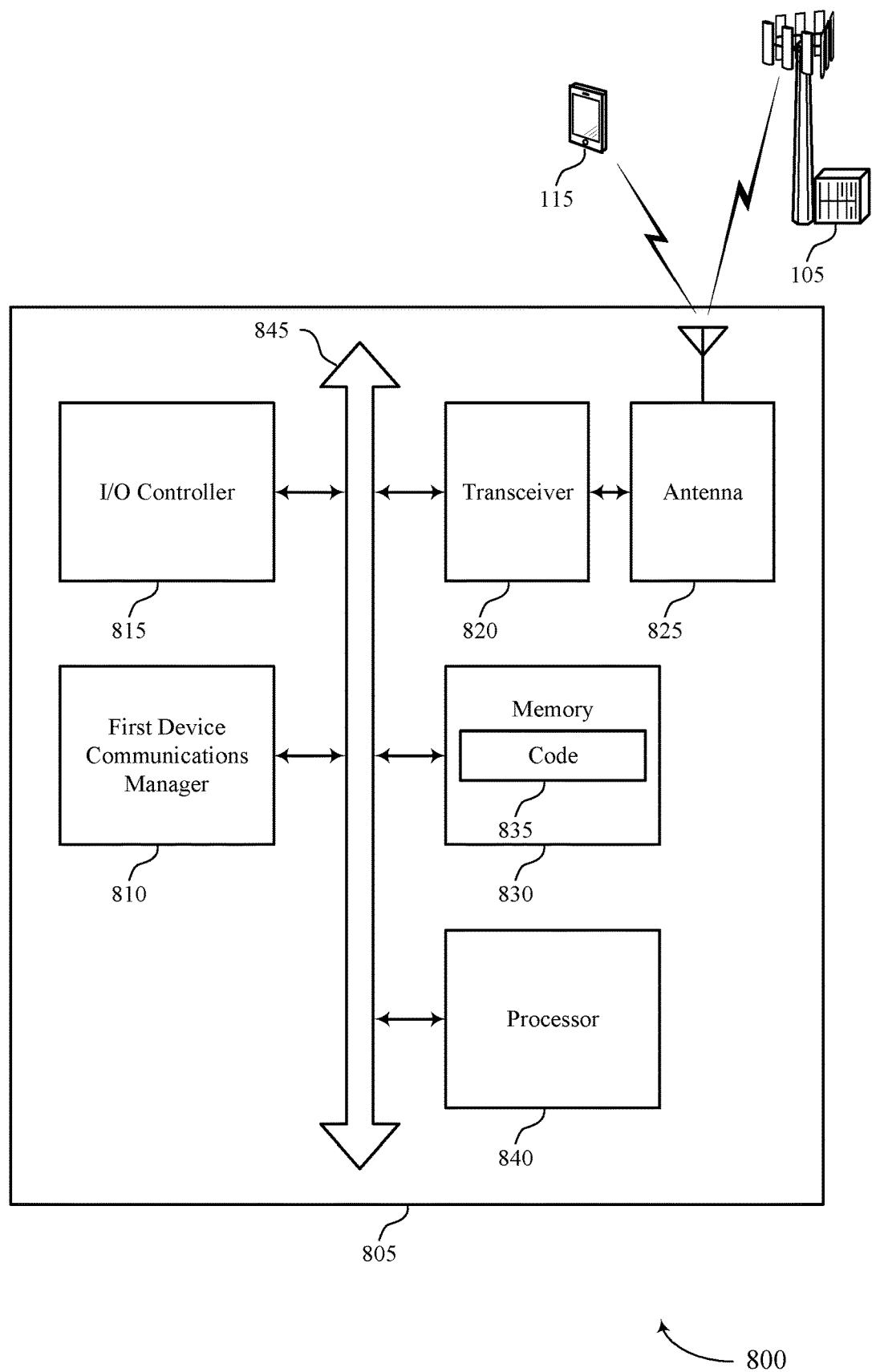
FIG. 8 shows a diagram of a system including a device that supports dynamic mixed mode beam correspondence in upper mmW bands in accordance with aspects of the present disclosure.

FIG. 8 shows a diagram of a system 800 including a device 805 that supports dynamic mixed mode beam correspondence in upper mmW bands in accordance with aspects of the present disclosure. The device 805 may be an example of or include the components of device 505, device 605, or a first device (e.g., a UE 115, a CPE, etc.) as described herein. The device 805 may include components for bi-directional voice and data communications including components for transmitting and receiving communications, including a first device communications manager 810, an I/O controller 815, a transceiver 820, an antenna 825, memory 830, and a processor 840. These components may be in electronic communication via one or more buses (e.g., bus 845).

The first device communications manager 810 may transmit, to a second device, a capability indicating a status for dynamic beam correspondence with the second device, transmission of the capability based on a first set of antenna elements being different from a second set of antenna elements, the first set of antenna elements used for downlink communications with the second device, and the second set of antenna elements used for uplink communications with the second device. Subsequently, the first device communications manager 810 may receive, from the second device, an indication of an operating mode to use for communications with the second device, the operating mode being based on the capability. Accordingly, the first device communications manager 810 may communicate with the second device (e.g., via a mmW frequency band) based on the received indication of the operating mode.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the device may include a single antenna 825. However, in some cases the device may have more than one antenna 825, which may be capable of concurrently transmitting or receiving multiple transmissions.

The memory 830 may include random-access memory (RAM) and read-only memory (ROM). The memory 830 may store computer-readable, computer-executable code 835 including instructions that, when executed, cause the processor to perform various functions described herein. In some cases, the memory 830 may contain, among other things, a basic I/O system (BIOS) which may control basic hardware or software operation such as the interaction with peripheral components or devices.

The processor 840 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting dynamic mixed mode beam correspondence in upper mmW bands).

The code 835 may include instructions to implement aspects of the present disclosure, including instructions to support communications, such as wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
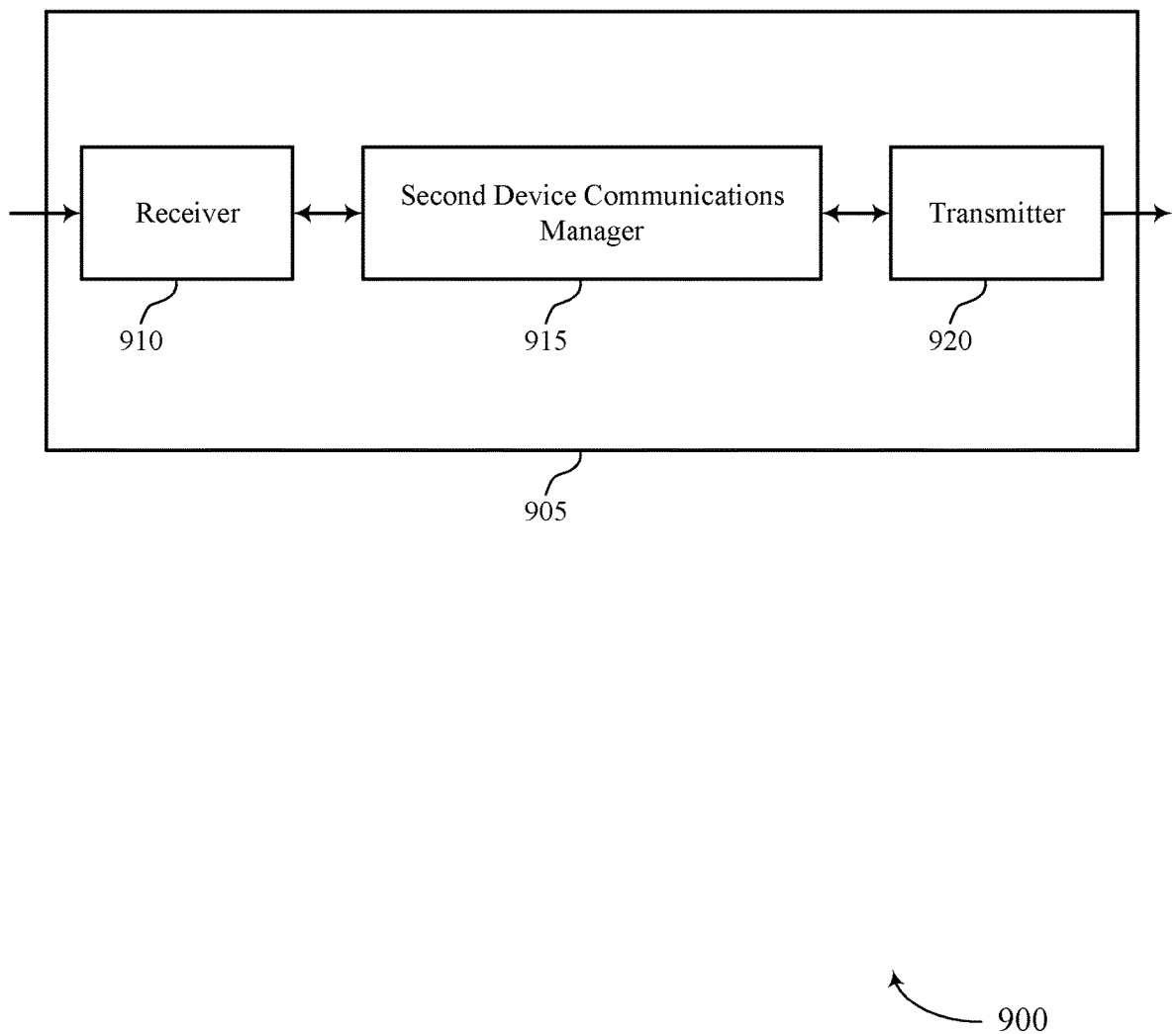
FIGS. 9 and 10 show block diagrams of devices that support dynamic mixed mode beam correspondence in upper mmW bands in accordance with aspects of the present disclosure.

FIG. 9 shows a block diagram 900 of a device 905 that supports dynamic mixed mode beam correspondence in upper mmW bands in accordance with aspects of the present disclosure. The device 905 may be an example of aspects of a second device (e.g., a base station 105, a CPE, a relay device, a router, a repeater, an IAB node, etc.) as described herein. The device 905 may include a receiver 910, a second device communications manager 915 (e.g., which may be an example of a base station communications manager 102 as described above with reference to FIG. 1), and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to dynamic mixed mode beam correspondence in upper mmW bands, etc.). Information may be passed on to other components of the device 905. The receiver 910 may be an example of aspects of the transceiver 1220 described with reference to FIG. 12. The receiver 910 may utilize a single antenna or a set of antennas.

The second device communications manager 915 may receive, from a first device that is in communications with the second device (e.g., via a mmW frequency band), a capability indicating a status for dynamic beam correspondence between the first device and the second device. In some cases, the second device communications manager 915 may transmit, to the first device, an indication of an operating mode to use for communications with the second device, the operating mode based on the received capability. Accordingly, the second device communications manager 915 may communicate with the first device (e.g., via the mmW frequency band) based on the transmitted indication of the operating mode. The second device communications manager 915 may be an example of aspects of the second device communications manager 1210 described herein.

The second device communications manager 915, or its sub-components, may be implemented in hardware, code (e.g., software or firmware) executed by a processor, or any combination thereof. If implemented in code executed by a processor, the functions of the second device communications manager 915, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The second device communications manager 915, or its sub-components, may be physically located at various positions, including being distributed such that portions of functions are implemented at different physical locations by one or more physical components. In some examples, the second device communications manager 915, or its sub-components, may be a separate and distinct component in accordance with various aspects of the present disclosure. In some examples, the second device communications manager 915, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
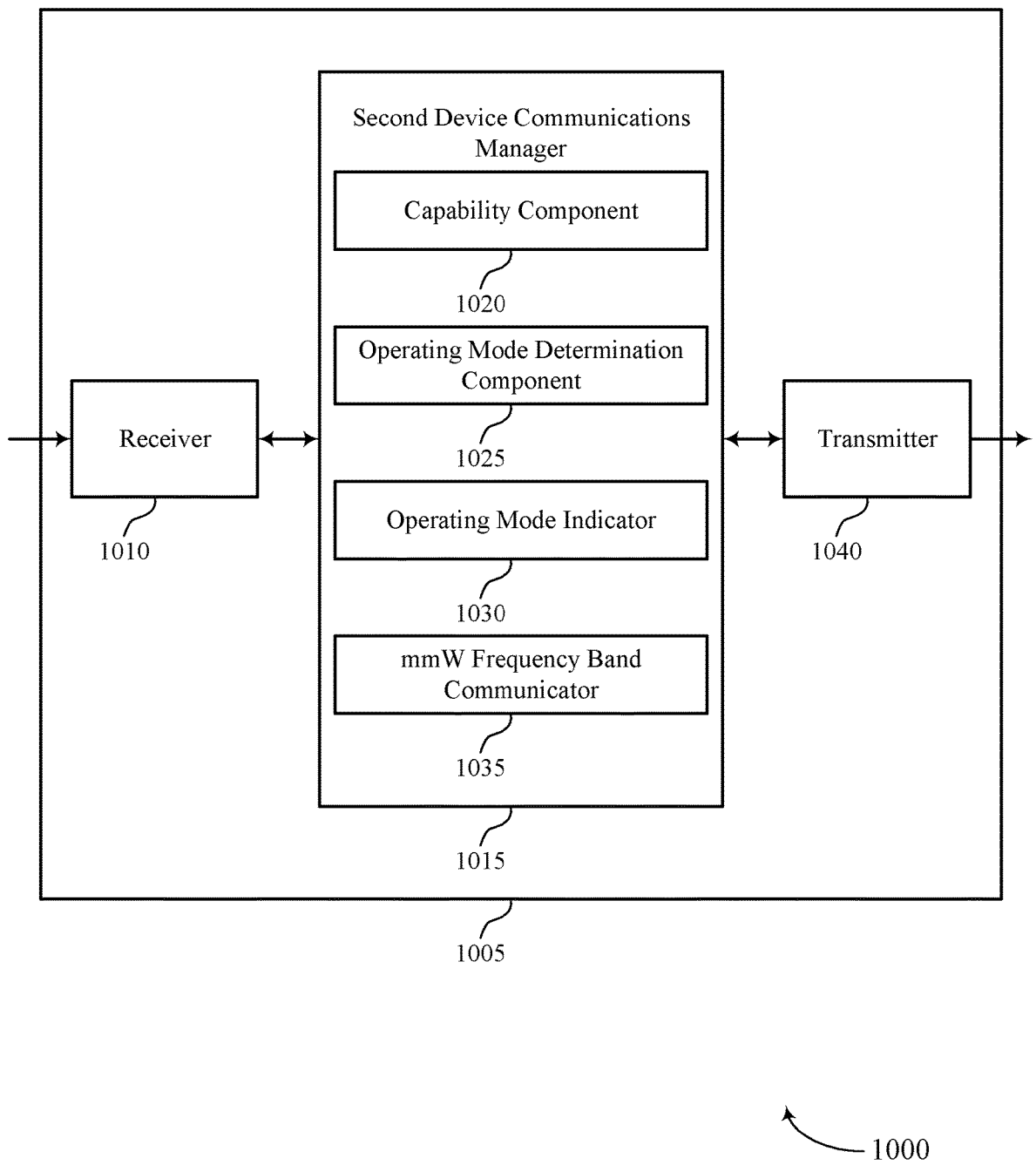

FIG. 10 shows a block diagram 1000 of a device 1005 that supports dynamic mixed mode beam correspondence in upper mmW bands in accordance with aspects of the present disclosure. The device 1005 may be an example of aspects of a device 905 or a second device (e.g., a base station 105, a CPE, a relay device, a router, a repeater, an IAB node, etc.) as described herein. The device 1005 may include a receiver 1010, a second device communications manager 1015, and a transmitter 1040. The device 1005 may also include a processor. Each of these components may be in communication with one another (e.g., via one or more buses).

The receiver 1010 may receive information such as packets, user data, or control information associated with various information channels (e.g., control channels, data channels, and information related to dynamic mixed mode beam correspondence in upper mmW bands, etc.). Information may be passed on to other components of the device 1005. The receiver 1010 may be an example of aspects of the transceiver 1220 described with reference to FIG. 12. The receiver 1010 may utilize a single antenna or a set of antennas.

The second device communications manager 1015 may be an example of aspects of the second device communications manager 915 as described herein. The second device communications manager 1015 may include a capability component 1020, an operating mode determination component 1025, an operating mode indicator 1030, and a mmW frequency band communicator 1035. The second device communications manager 1015 may be an example of aspects of the second device communications manager 1210 described herein.

The capability component 1020 may receive, from a first device that is in communications with the second device (e.g., via a mmW frequency band), a capability indicating a status for dynamic beam correspondence between the first device and the second device.

The operating mode determination component 1025 may determine an operating mode for communications with the first device based on the received capability.

The operating mode indicator 1030 may transmit, to the first device, an indication of the operating mode to use for communications with the second device.

The mmW frequency band communicator 1035 may communicate with the first device (e.g., via the mmW frequency band) based on the transmitted indication of the operating mode.

The transmitter 1040 may transmit signals generated by other components of the device 1005. In some examples, the transmitter 1040 may be collocated with a receiver 1010 in a transceiver module. For example, the transmitter 1040 may be an example of aspects of the transceiver 1220 described with reference to FIG. 12. The transmitter 1040 may utilize a single antenna or a set of antennas.

Figure 11:
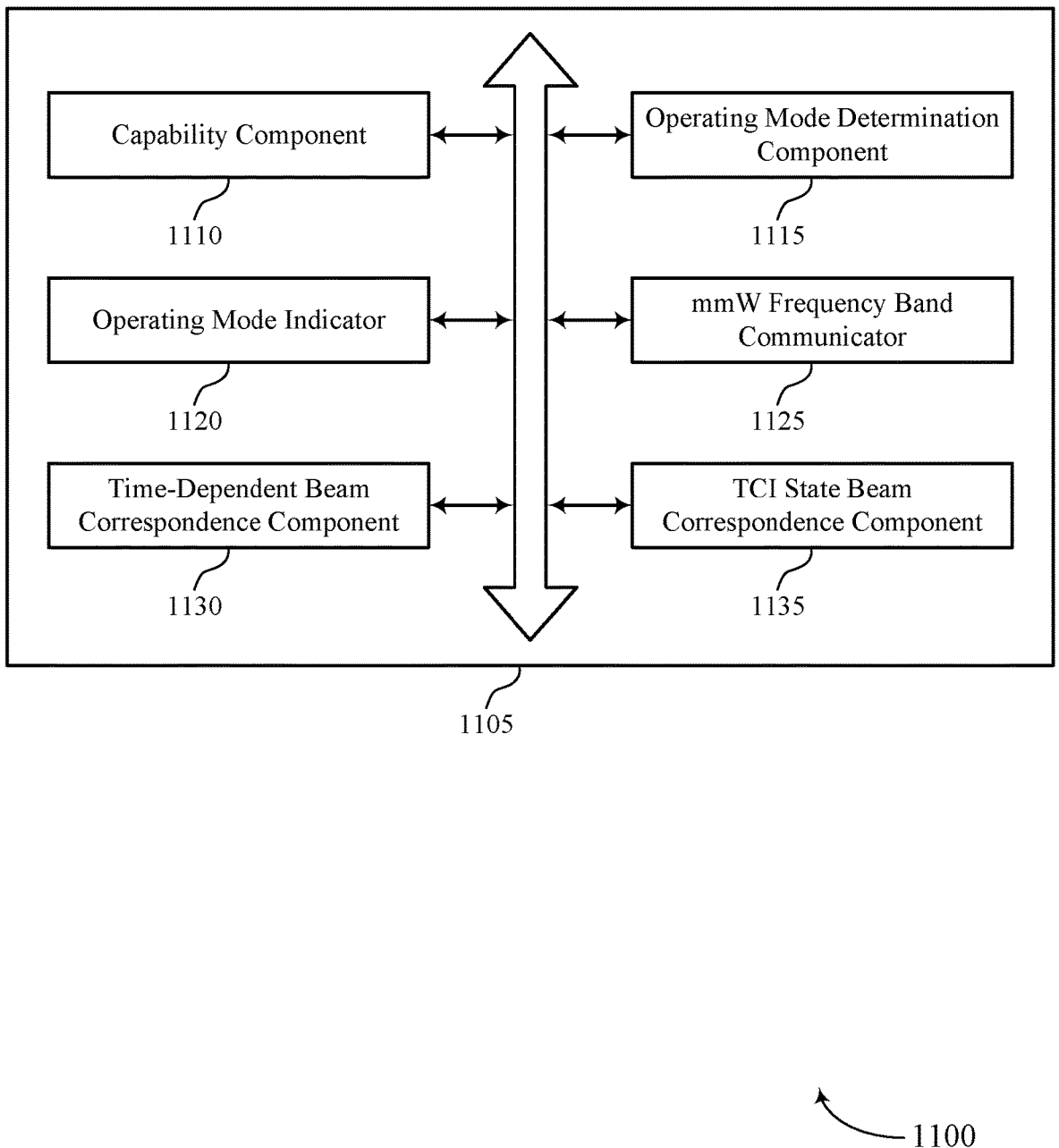
FIG. 11 shows a block diagram of a second device communications manager that supports dynamic mixed mode beam correspondence in upper mmW bands in accordance with aspects of the present disclosure.

FIG. 11 shows a block diagram 1100 of a second device communications manager 1105 that supports dynamic mixed mode beam correspondence in upper mmW bands in accordance with aspects of the present disclosure. The second device communications manager 1105 may be an example of aspects of a second device communications manager 915, a second device communications manager 1015, or a second device communications manager 1210 described herein. The second device communications manager 1105 may include a capability component 1110, an operating mode determination component 1115, an operating mode indicator 1120, a mmW frequency band communicator 1125, a time-dependent beam correspondence component 1130, and a TCI state beam correspondence component 1135. Each of these modules may communicate, directly or indirectly, with one another (e.g., via one or more buses).

The capability component 1110 may receive, from a first device that is in communications with the second device (e.g., via a mmW frequency band), a capability indicating a status for dynamic beam correspondence between the first device and the second device. In some examples, the capability component 1110 may receive, from the first device, an indication of no beam correspondence and may receive, from the first device, an amount of power savings, a reduction in temperature or temperature gradient, or both for the communications with the first device, where the amount of power savings, the reduction in temperature or temperature gradient, or both result from the no beam correspondence.

In some cases, the capability indicating the status for dynamic beam correspondence with the second device may include a mixed beam correspondence mode operation indication. Additionally, the first device may be a UE or a CPE in a wireless communications system, and the second device may be a base station, a CPE, a relay device, a router, a repeater, or an IAB node in the wireless communications system.

The operating mode determination component 1115 may determine an operating mode for communications with the first device based on the received capability.

The operating mode indicator 1120 may transmit, to the first device, an indication of the operating mode to use for communications with the second device. For example, the operating mode indicator 1120 may transmit, to the first device, an indication to use one or more TCI states, one or more subarrays, or a combination thereof, where the one or more TCI states, the one or more subarrays, or the combination thereof have full beam correspondence for the communications with the second device. In some cases, the one or more TCI states, the one or more subarrays, or the combination thereof are used for an initial access procedure, for a beam failure recovery procedure, or both. Additionally or alternatively, the one or more TCI states, the one or more subarrays, or the combination thereof are used for a low power mode, a high temperature or temperature gradient mode, or both. In some cases, the full beam correspondence may include a calibration adjusted same set of beam weights, antenna amplitudes, antenna phases, or a combination thereof that are used for both a downlink beam and an uplink beam for the communications with the first device.

The mmW frequency band communicator 1125 may communicate with the first device (e.g., via the mmW frequency band) based on the transmitted indication of the operating mode. In some cases, the communications with the first device may occur on frequencies that are greater than 24.25 GHz.

The time-dependent beam correspondence component 1130 may receive, from the first device, a time-dependent status for the dynamic beam correspondence between the first device and the second device. In some cases, the time-dependent status for the dynamic beam correspondence may include an indication of beam correspondence for a first TTI, an indication of no beam correspondence for a second TTI, or a combination thereof. Additionally, the time-dependent status may indicate a beam correspondence capability that changes for different TTIs. For example, the different TTIs may include different symbols, slots, or subframes.

The TCI state beam correspondence component 1135 may receive, from the first device, a first indication of beam correspondence for one or more first TCI states, a second indication of no beam correspondence for one or more second TCI states, or a combination thereof. In some cases, the first indication of beam correspondence, the second indication of no beam correspondence, or both may be time-dependent.

Figure 12:
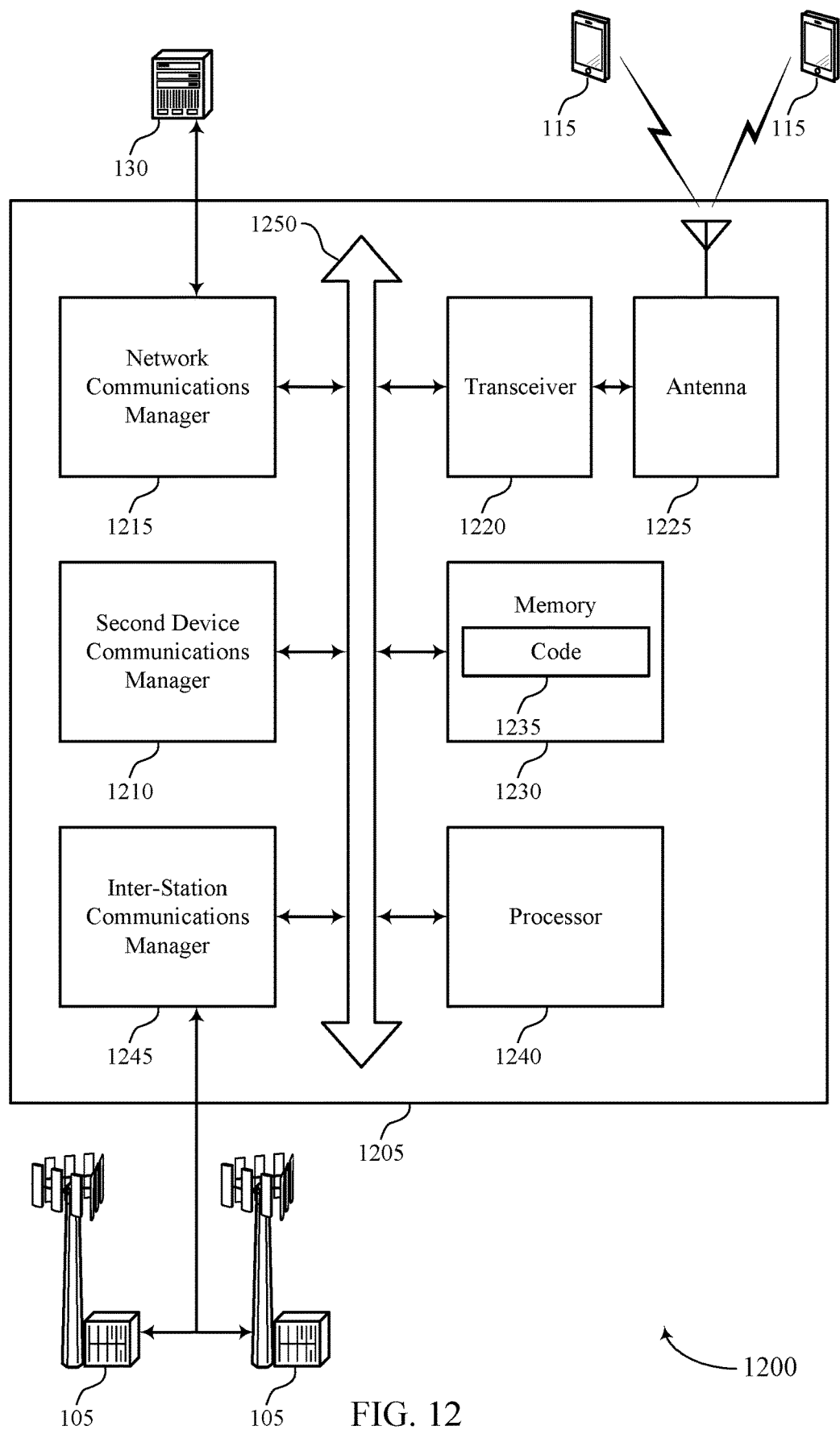
FIG. 12 shows a diagram of a system including a device that supports dynamic mixed mode beam correspondence in upper mmW bands in accordance with aspects of the present disclosure.

FIG. 12 shows a diagram of a system 1200 including a device 1205 that supports dynamic mixed mode beam correspondence in upper mmW bands in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a second device communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The second device communications manager 1210 may receive, from a first device that is in communications with the second device (e.g., via a mmW frequency band), a capability indicating a status for dynamic beam correspondence between the first device and the second device. In some cases, the second device communications manager 1210 may transmit, to the first device, an indication of an operating mode to use for communications with the second device, the operating mode based on the received capability. Accordingly, the second device communications manager 1210 may communicate with the first device (e.g., via the mmW frequency band) based on the transmitted indication of the operating mode.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described above. For example, the transceiver 1220 may represent a transceiver and may communicate bi-directionally with another transceiver. The transceiver 1220 may also include a modem to modulate the packets and provide the modulated packets to the antennas for transmission, and to demodulate packets received from the antennas.

In some cases, the device may include a single antenna 1225. However, in some cases the device may have more than one antenna 1225, which may be capable of concurrently transmitting or receiving multiple transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting dynamic mixed mode beam correspondence in upper mmW bands).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support communications, such as wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
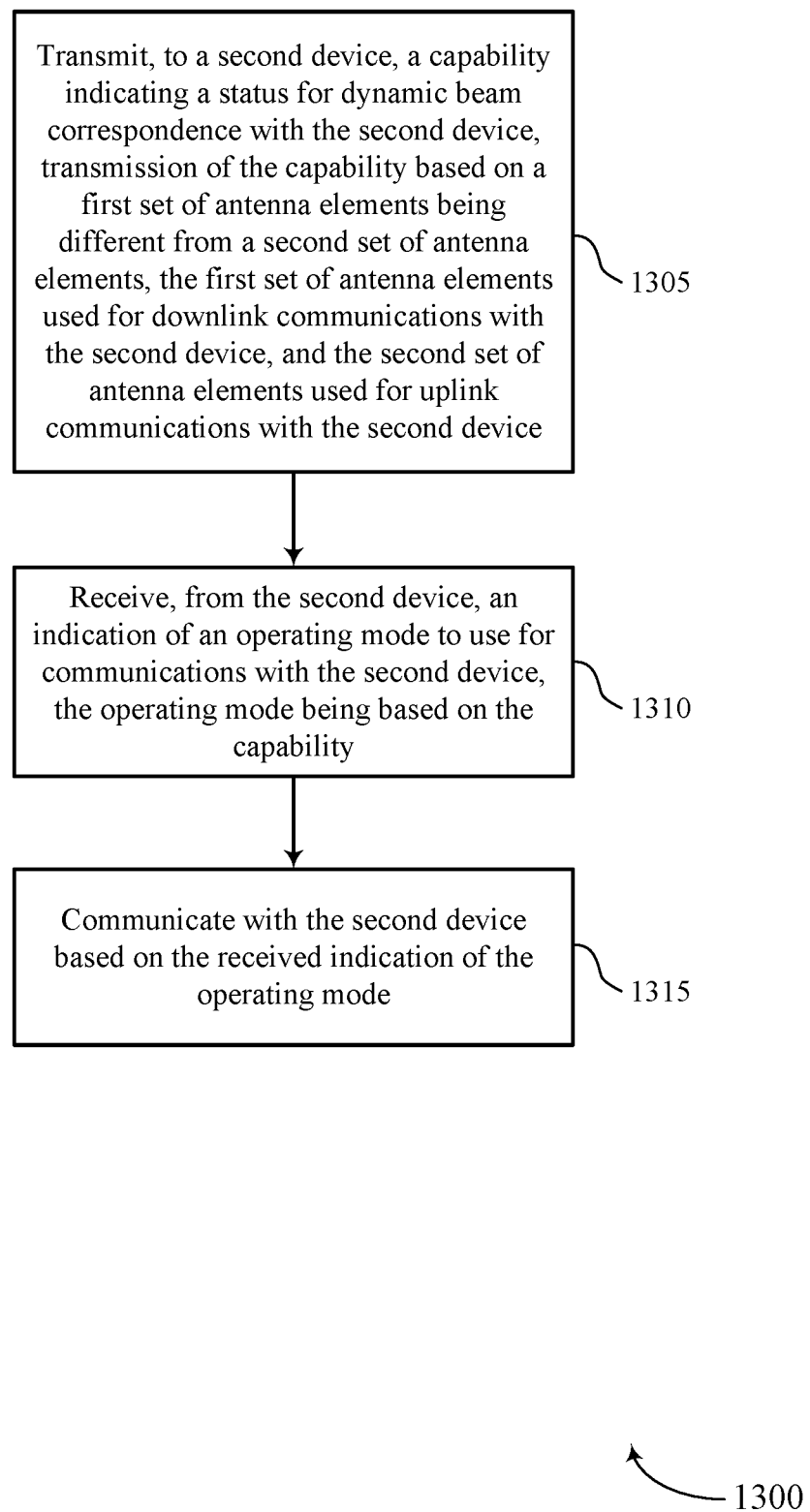
FIGS. 13 through 18 show flowcharts illustrating methods that support dynamic mixed mode beam correspondence in upper mmW bands in accordance with aspects of the present disclosure.

FIG. 13 shows a flowchart illustrating a method 1300 that supports dynamic mixed mode beam correspondence in upper mmW bands in accordance with aspects of the present disclosure. The operations of method 1300 may be implemented by a first device (e.g., a UE 115, a CPE, etc.) or its components as described herein. For example, the operations of method 1300 may be performed by a first device communications manager as described with reference to FIGS. 5 through 8. In some examples, a first device may execute a set of instructions to control the functional elements of the first device to perform the functions described below. Additionally or alternatively, a first device may perform aspects of the functions described below using special-purpose hardware.

At 1305, the first device may transmit, to a second device, a capability indicating a status for dynamic beam correspondence with the second device, transmission of the capability based on a first set of antenna elements being different from a second set of antenna elements, the first set of antenna elements used for downlink communications with the second device, and the second set of antenna elements used for uplink communications with the second device. The operations of 1305 may be performed according to the methods described herein. In some examples, aspects of the operations of 1305 may be performed by a mixed beam correspondence indicator as described with reference to FIGS. 5 through 8.

At 1310, the first device may receive, from the second device, an indication of an operating mode to use for communications with the second device, the operating mode being based on the capability. The operations of 1310 may be performed according to the methods described herein. In some examples, aspects of the operations of 1310 may be performed by an operating mode component as described with reference to FIGS. 5 through 8.

At 1315, the first device may communicate with the second device based on the received indication of the operating mode. The operations of 1315 may be performed according to the methods described herein. In some examples, aspects of the operations of 1315 may be performed by an operating mode communicator as described with reference to FIGS. 5 through 8.

Figure 14:
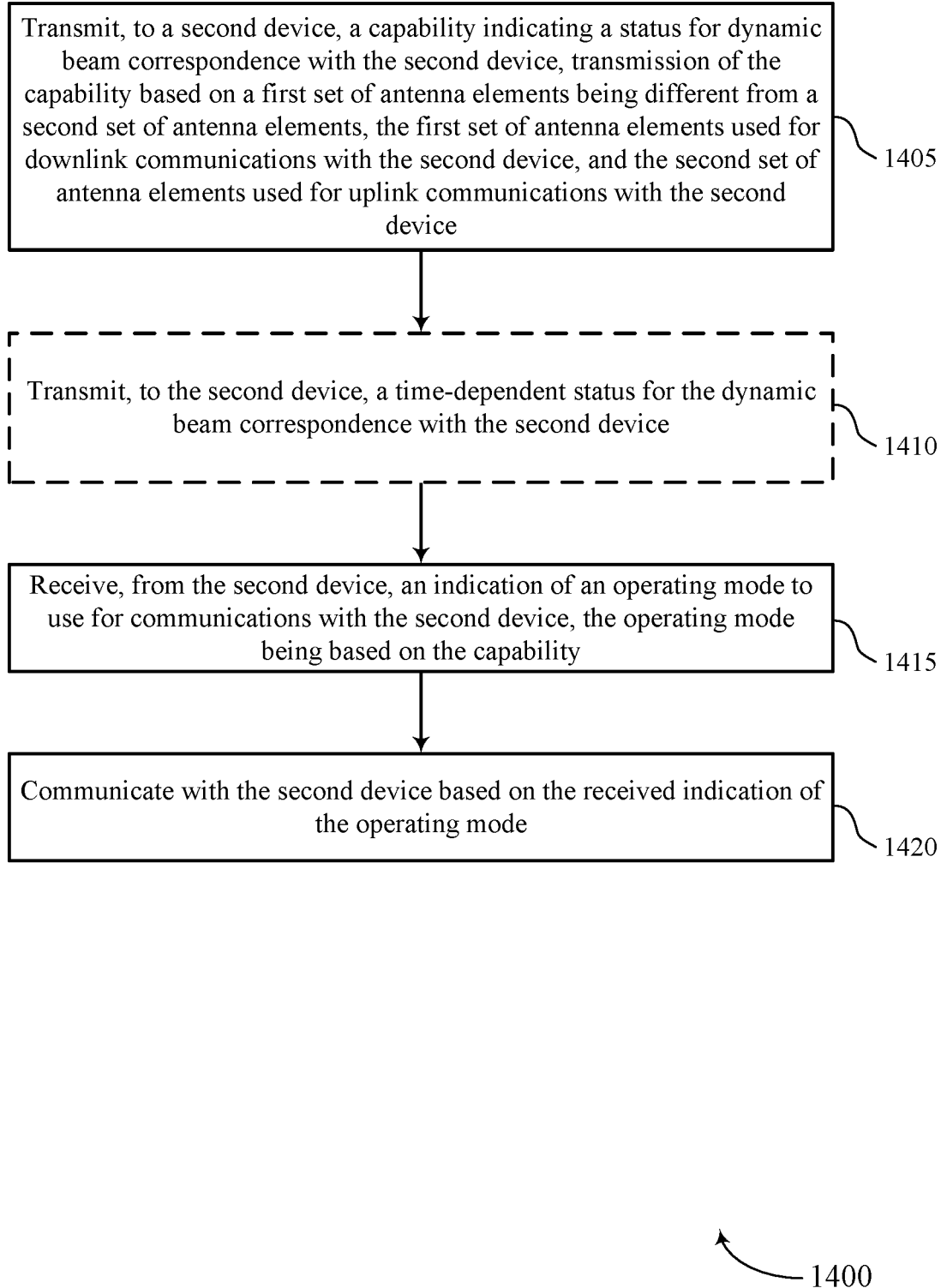

FIG. 14 shows a flowchart illustrating a method 1400 that supports dynamic mixed mode beam correspondence in upper mmW bands in accordance with aspects of the present disclosure. The operations of method 1400 may be implemented by a first device (e.g., a UE 115, a CPE, etc.) or its components as described herein. For example, the operations of method 1400 may be performed by a first device communications manager as described with reference to FIGS. 5 through 8. In some examples, a first device may execute a set of instructions to control the functional elements of the first device to perform the functions described below. Additionally or alternatively, a first device may perform aspects of the functions described below using special-purpose hardware.

At 1405, the first device may transmit, to the second device, a capability indicating a status for dynamic beam correspondence with a second device, transmission of the capability based on a first set of antenna elements being different from a second set of antenna elements, the first set of antenna elements used for downlink communications with the second device, and the second set of antenna elements used for uplink communications with the second device. The operations of 1410 may be performed according to the methods described herein. In some examples, aspects of the operations of 1410 may be performed by a mixed beam correspondence indicator as described with reference to FIGS. 5 through 8.

At 1415, the first device may transmit, to the second device, a time-dependent status for the dynamic beam correspondence with the second device. The operations of 1415 may be performed according to the methods described herein. In some examples, aspects of the operations of 1415 may be performed by a time-dependent beam correspondence indicator as described with reference to FIGS. 5 through 8.

At 1420, the first device may receive, from the second device, an indication of an operating mode to use for communications with the second device, the operating mode being based on the capability. The operations of 1420 may be performed according to the methods described herein. In some examples, aspects of the operations of 1420 may be performed by an operating mode component as described with reference to FIGS. 5 through 8.

At 1425, the first device may communicate with the second device based on the received indication of the operating mode. The operations of 1425 may be performed according to the methods described herein. In some examples, aspects of the operations of 1425 may be performed by an operating mode communicator as described with reference to FIGS. 5 through 8.

Figure 15:
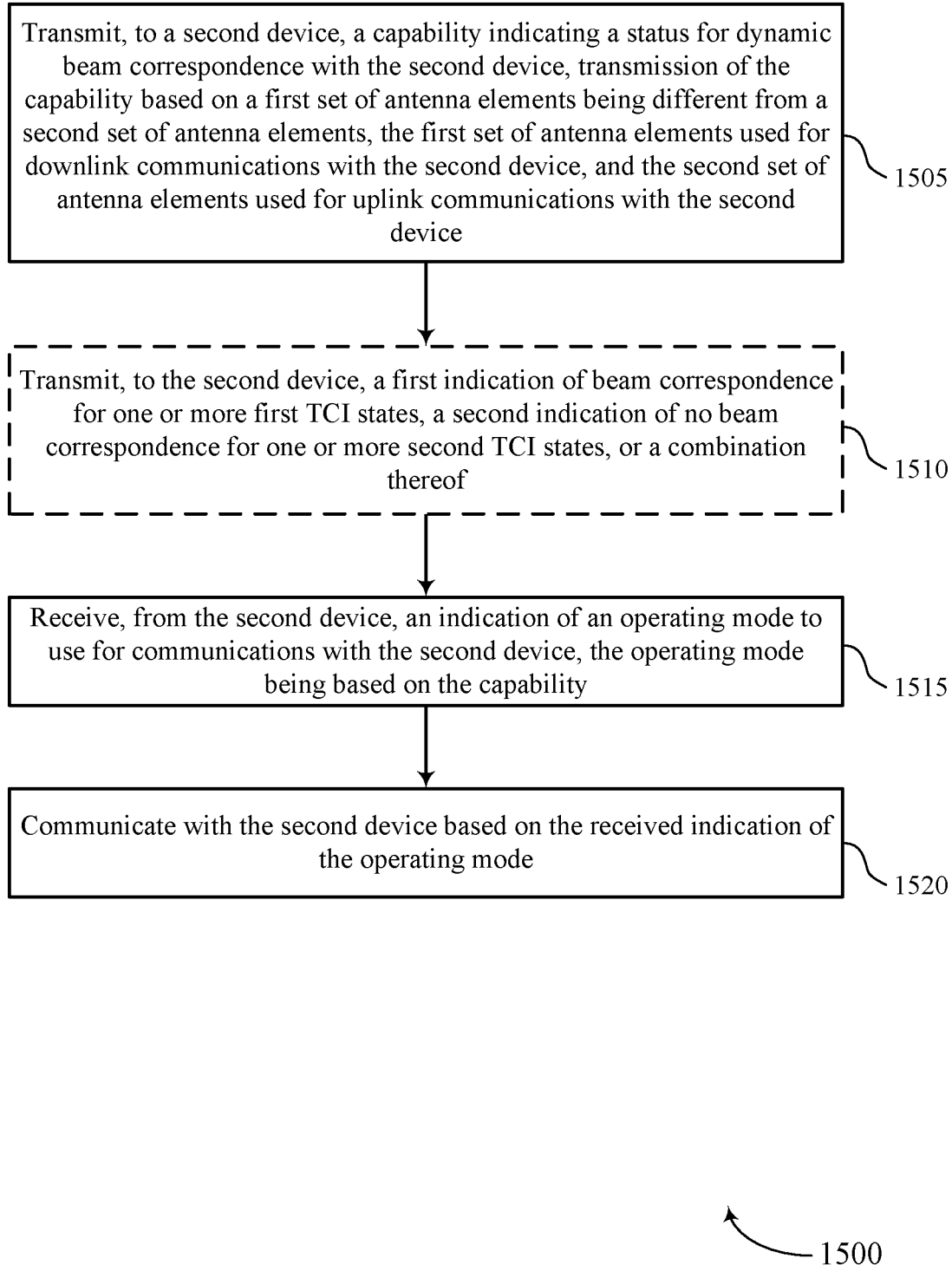

FIG. 15 shows a flowchart illustrating a method 1500 that supports dynamic mixed mode beam correspondence in upper mmW bands in accordance with aspects of the present disclosure. The operations of method 1500 may be implemented by a first device (e.g., a UE 115, a CPE, etc.) or its components as described herein. For example, the operations of method 1500 may be performed by a first device communications manager as described with reference to FIGS. 5 through 8. In some examples, a first device may execute a set of instructions to control the functional elements of the first device to perform the functions described below. Additionally or alternatively, a first device may perform aspects of the functions described below using special-purpose hardware.

At 1505, the first device may transmit, to the second device, a capability indicating a status for dynamic beam correspondence with a second device, transmission of the capability based on a first set of antenna elements being different from a second set of antenna elements, the first set of antenna elements used for downlink communications with the second device, and the second set of antenna elements used for uplink communications with the second device. The operations of 1505 may be performed according to the methods described herein. In some examples, aspects of the operations of 1505 may be performed by a mixed beam correspondence indicator as described with reference to FIGS. 5 through 8.

At 1510, the first device may transmit, to the second device, a first indication of beam correspondence for one or more first TCI states, a second indication of no beam correspondence for one or more second TCI states, or a combination thereof. The operations of 1510 may be performed according to the methods described herein. In some examples, aspects of the operations of 1510 may be performed by a TCI state beam correspondence indicator as described with reference to FIGS. 5 through 8.

At 1515, the first device may receive, from the second device, an indication of an operating mode to use for communications with the second device, the operating mode being based on the capability. The operations of 1515 may be performed according to the methods described herein. In some examples, aspects of the operations of 1515 may be performed by an operating mode component as described with reference to FIGS. 5 through 8.

At 1520, the first device may communicate with the second device based on the received indication of the operating mode. The operations of 1520 may be performed according to the methods described herein. In some examples, aspects of the operations of 1520 may be performed by an operating mode communicator as described with reference to FIGS. 5 through 8.

Figure 16:
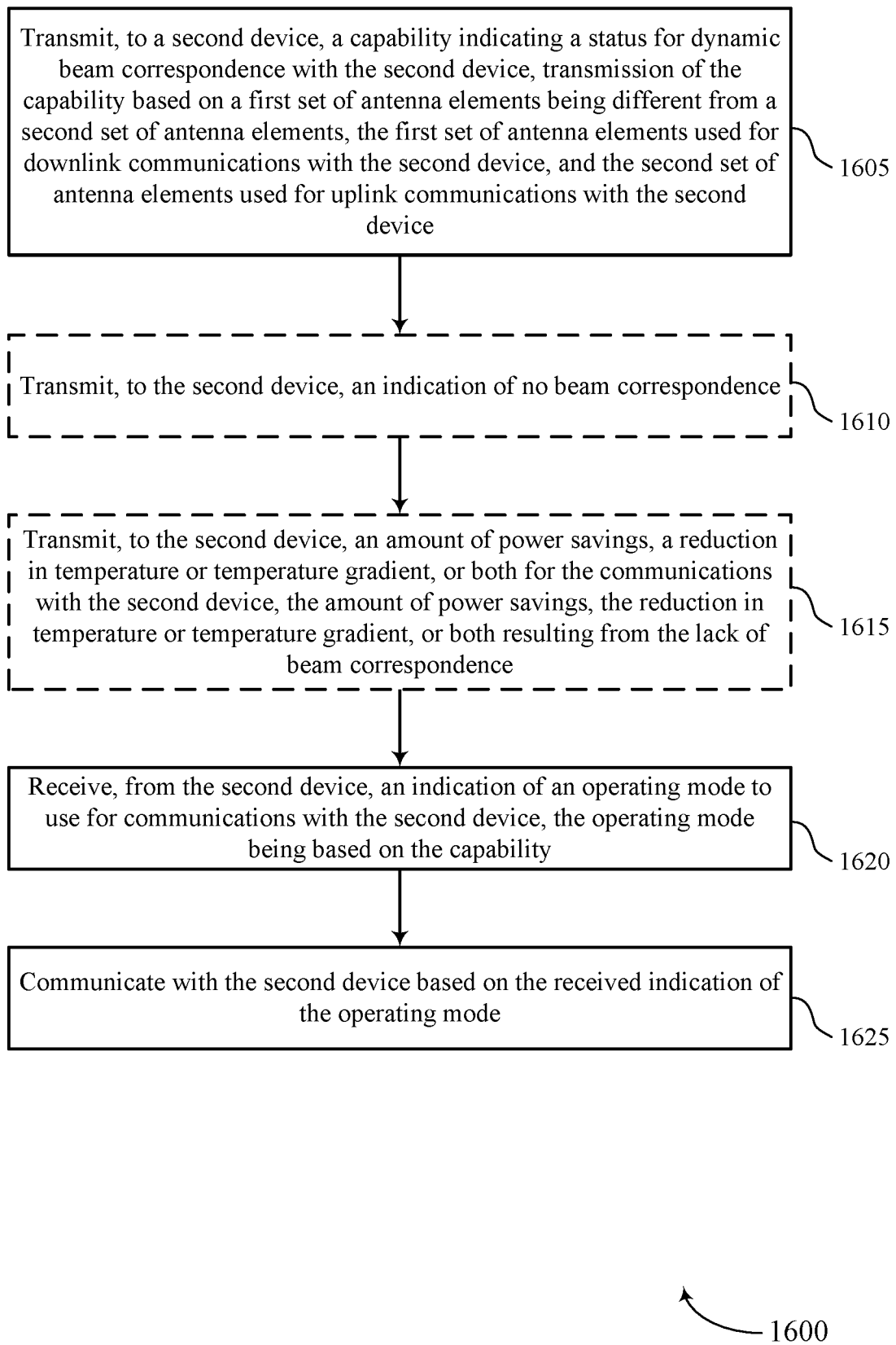

FIG. 16 shows a flowchart illustrating a method 1600 that supports dynamic mixed mode beam correspondence in upper mmW bands in accordance with aspects of the present disclosure. The operations of method 1600 may be implemented by a first device (e.g., a UE 115, a CPE, etc.) or its components as described herein. For example, the operations of method 1600 may be performed by a first device communications manager as described with reference to FIGS. 5 through 8. In some examples, a first device may execute a set of instructions to control the functional elements of the first device to perform the functions described below. Additionally or alternatively, a first device may perform aspects of the functions described below using special-purpose hardware.

At 1605, the first device may transmit, to a second device, a capability indicating a status for dynamic beam correspondence with the second device, transmission of the capability based on a first set of antenna elements being different from a second set of antenna elements, the first set of antenna elements used for downlink communications with the second device, and the second set of antenna elements used for uplink communications with the second device. The operations of 1605 may be performed according to the methods described herein. In some examples, aspects of the operations of 1605 may be performed by a mixed beam correspondence indicator as described with reference to FIGS. 5 through 8.

At 1610, the first device may transmit, to the second device, an indication of no beam correspondence. The operations of 1610 may be performed according to the methods described herein. In some examples, aspects of the operations of 1610 may be performed by a mixed beam correspondence indicator as described with reference to FIGS. 5 through 8.

At 1615, the first device may transmit, to the second device, an amount of power savings, a reduction in temperature or temperature gradient, or both for the communications with the second device, the amount of power savings, the reduction in temperature or temperature gradient, or both resulting from the lack of beam correspondence. The operations of 1615 may be performed according to the methods described herein. In some examples, aspects of the operations of 1615 may be performed by a mixed beam correspondence indicator as described with reference to FIGS. 5 through 8.

At 1620, the first device may receive, from the second device, an indication of an operating mode to use for communications with the second device, the operating mode being based on the capability. The operations of 1620 may be performed according to the methods described herein. In some examples, aspects of the operations of 1620 may be performed by an operating mode component as described with reference to FIGS. 5 through 8.

At 1625, the first device may communicate with the second device based on the received indication of the operating mode. The operations of 1625 may be performed according to the methods described herein. In some examples, aspects of the operations of 1625 may be performed by an operating mode communicator as described with reference to FIGS. 5 through 8.

Figure 17:
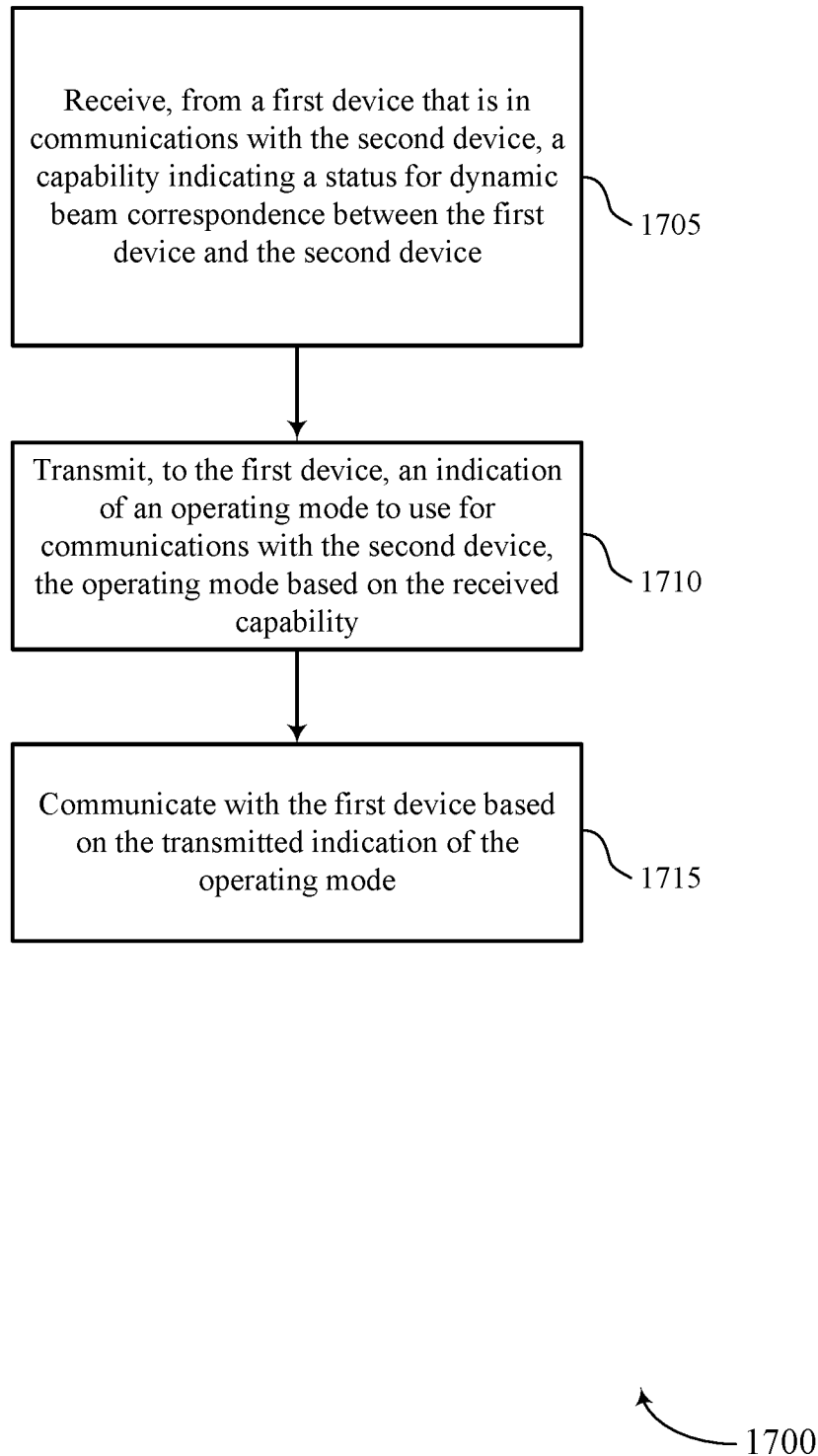

FIG. 17 shows a flowchart illustrating a method 1700 that supports dynamic mixed mode beam correspondence in upper mmW bands in accordance with aspects of the present disclosure. The operations of method 1700 may be implemented by a second device (e.g., a base station 105, a CPE, a relay device, a router, a repeater, an IAB node, etc.) or its components as described herein. For example, the operations of method 1700 may be performed by a second device communications manager as described with reference to FIGS. 9 through 12. In some examples, a second device may execute a set of instructions to control the functional elements of the second device to perform the functions described below. Additionally or alternatively, a second device may perform aspects of the functions described below using special-purpose hardware.

At 1705, the second device may receive, from a first device that is in communications with the second device, a capability indicating a status for dynamic beam correspondence between the first device and the second device. The operations of 1705 may be performed according to the methods described herein. In some examples, aspects of the operations of 1705 may be performed by a capability component as described with reference to FIGS. 9 through 12.

At 1710, the second device may transmit, to the first device, an indication of an operating mode to use for communications with the second device, the operating mode based on the received capability. The operations of 1710 may be performed according to the methods described herein. In some examples, aspects of the operations of 1710 may be performed by an operating mode indicator as described with reference to FIGS. 9 through 12.

At 1715, the second device may communicate with the first device based on the transmitted indication of the operating mode. The operations of 1715 may be performed according to the methods described herein. In some examples, aspects of the operations of 1715 may be performed by a mmW frequency band communicator as described with reference to FIGS. 9 through 12.

Figure 18:
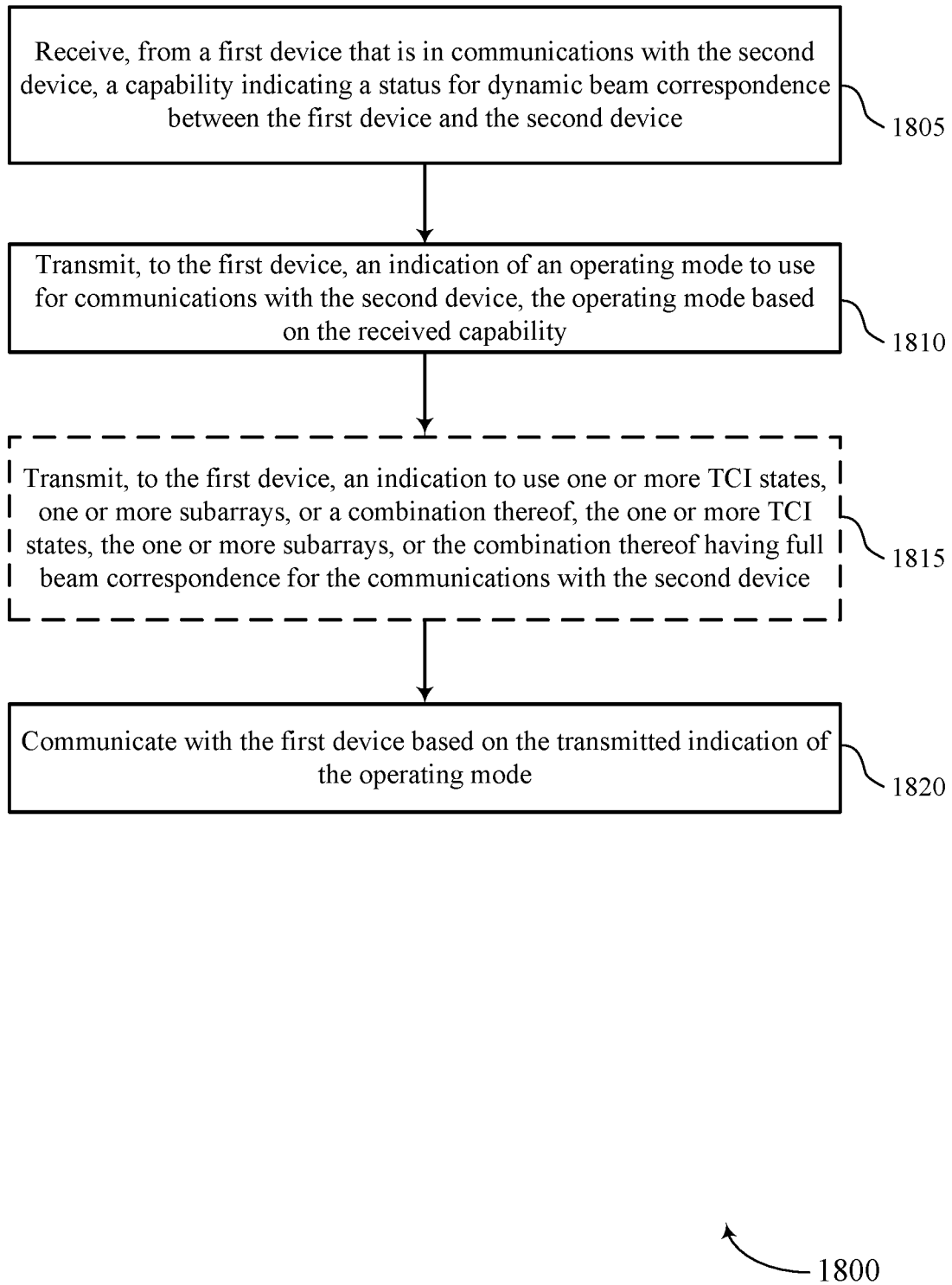

FIG. 18 shows a flowchart illustrating a method 1800 that supports dynamic mixed mode beam correspondence in upper mmW bands in accordance with aspects of the present disclosure. The operations of method 1800 may be implemented by a second device (e.g., a base station 105, a CPE, a relay device, a router, a repeater, an IAB node, etc.) or its components as described herein. For example, the operations of method 1800 may be performed by a second device communications manager as described with reference to FIGS. 9 through 12. In some examples, a second device may execute a set of instructions to control the functional elements of the second device to perform the functions described below. Additionally or alternatively, a second device may perform aspects of the functions described below using special-purpose hardware.

At 1805, the second device may receive, from a first device that is in communications with the second device via a mmW frequency band, a capability indicating a status for dynamic beam correspondence between the first device and the second device. The operations of 1805 may be performed according to the methods described herein. In some examples, aspects of the operations of 1805 may be performed by a capability component as described with reference to FIGS. 9 through 12.

At 1810, the second device may transmit, to the first device, an indication of an operating mode to use for communications with the second device, the operating mode based on the received capability. The operations of 1810 may be performed according to the methods described herein. In some examples, aspects of the operations of 1810 may be performed by an operating mode indicator as described with reference to FIGS. 9 through 12.

At 1815, the second device may transmit, to the first device, an indication to use one or more TCI states, one or more subarrays, or a combination thereof, the one or more TCI states, the one or more subarrays, or the combination thereof having full beam correspondence for the communications with the second device. The operations of 1815 may be performed according to the methods described herein. In some examples, aspects of the operations of 1815 may be performed by an operating mode indicator as described with reference to FIGS. 9 through 12.

At 1820, the second device may communicate with the first device based on the transmitted indication of the operating mode. The operations of 1820 may be performed according to the methods described herein. In some examples, aspects of the operations of 1820 may be performed by a mmW frequency band communicator as described with reference to FIGS. 9 through 12.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

Aspect 1: A method for wireless communications at a first device, comprising: transmitting, to a second device, a capability indicating a status for dynamic beam correspondence with the second device, transmission of the capability based at least in part on a first set of antenna elements being different from a second set of antenna elements, the first set of antenna elements used for downlink communications with the second device, and the second set of antenna elements used for uplink communications with the second device; receiving, from the second device, an indication of an operating mode to use for communications with the second device, the operating mode being based at least in part on the capability; and communicating with the second device based at least in part on the received indication of the operating mode.

Aspect 2: The method of aspect 1, the transmitting the capability comprising: transmitting, to the second device, a time-dependent status for the dynamic beam correspondence with the second device.

Aspect 3: The method of aspect 2, the time-dependent status for the dynamic beam correspondence comprising an indication of beam correspondence for a first transmission time interval, an indication of no beam correspondence for a second transmission time interval, or a combination thereof.

Aspect 4: The method of any of aspects 2 or 3, the time-dependent status indicating a beam correspondence capability that changes for different transmission time intervals.

Aspect 5: The method of any of aspect 4, the different transmission time intervals comprising different symbols, slots, or subframes Aspect 6: The method of any of aspects 1 to 5, the transmitting the capability comprising: transmitting, to the second device, a first indication of beam correspondence for one or more first transmission configuration indication states, a second indication of no beam correspondence for one or more second transmission configuration indication states, or a combination thereof.

Aspect 7: The method of aspect 6, wherein the first indication of beam correspondence, the second indication of no beam correspondence, or both are time-dependent.

Aspect 8: The method of any of aspects 1 to 7, the transmitting the capability comprising: transmitting, to the second device, an indication of no beam correspondence; and transmitting, to the second device, an amount of power savings, a reduction in temperature or temperature gradient, or both for the communications with the second device, wherein the amount of power savings, the reduction in temperature or temperature gradient, or both result from the lack of beam correspondence.

Aspect 9: The method of any of aspects 1 to 8, the receiving the indication of the operating mode comprising: receiving, from the second device, an indication to use one or more transmission configuration indication states, one or more subarrays, or a combination thereof, the one or more transmission configuration states, the one or more subarrays, or the combination thereof having full beam correspondence for the communications with the second device.

Aspect 10: The method of aspect 9, wherein the one or more transmission configuration indication states, the one or more subarrays, or the combination thereof are used for an initial access procedure, for a beam failure recovery procedure, or both.

Aspect 11: The method of any of aspects 9 or 10, wherein the one or more transmission configuration indication states, the one or more subarrays, or the combination thereof are used for a low power mode, a high temperature or temperature gradient mode, or both.

Aspect 12: The method of any of aspects 9 to 11, wherein the full beam correspondence comprises a calibration adjusted same set of beam weights, antenna amplitudes, antenna phases, or a combination thereof that are used for both a downlink beam and an uplink beam for the communications with the second device.

Aspect 13: The method of any of aspects 1 to 12, the capability indicating the status for dynamic beam correspondence with the second device comprising a mixed beam correspondence mode operation indication.

Aspect 14: The method of any of aspects 1 to 13, the communications with the second device occurring on frequencies that are greater than 24.25 GHz.

Aspect 15: The method of any of aspects 1 to 14, wherein the first device is a user equipment (UE) or a customer premises equipment (CPE) in a wireless communications system and the second device is a base station, a CPE, a relay device, a router, a repeater, or an integrated access and backhaul (IAB) node in the wireless communications system.

Aspect 16: An apparatus comprising at least one means for performing a method of any of aspects 1 to 15.

Aspect 17: An apparatus for wireless communications comprising a processor; and memory coupled to the processor, the processor and memory configured to perform a method of any of aspects 1 to 15.

Aspect 18: A non-transitory computer-readable medium storing code for wireless communications, the code comprising instructions executable by a processor to perform a method of any of aspects 1 to 15.

Aspect 19: A method for wireless communications at a second device, comprising: receiving, from a first device that is in communications with the second device, a capability indicating a status for dynamic beam correspondence between the first device and the second device; transmitting, to the first device, an indication of an operating mode to use for communications with the second device, the operating mode based at least in part on the received capability; and communicating with the first device based at least in part on the transmitted indication of the operating mode.

Aspect 20: The method of aspect 19, the receiving the capability comprising: receiving, from the first device, a time-dependent status for the dynamic beam correspondence between the first device and the second device, the time-dependent status indicating a beam correspondence capability that changes for different transmission time intervals.

Aspect 21: The method of aspect 20, the time-dependent status for the dynamic beam correspondence comprising an indication of beam correspondence for a first transmission time interval, an indication of no beam correspondence for a second transmission time interval, or a combination thereof.

Aspect 22: The method of any of aspects 20 or 21, the time-dependent status indicating a beam correspondence capability that changes for different transmission time intervals.

Aspect 23: The method of any of aspects 22, the different transmission time intervals comprising different symbols, slots, or subframes Aspect 24: The method of any of aspects 19 to 23, the receiving the capability comprising: receiving, from the first device, a first indication of beam correspondence for one or more first transmission configuration indication states, a second indication of no beam correspondence for one or more second transmission configuration indication states, or a combination thereof.

Aspect 25: The method of aspect 24, wherein the first indication of beam correspondence, the second indication of no beam correspondence, or both are time-dependent.

Aspect 26: The method of any of aspects 19 to 25, the receiving the capability comprising: receiving, from the first device, an indication of no beam correspondence; and receiving, from the first device, an amount of power savings, a reduction in temperature or temperature gradient, or both for the communications with the first device, the amount of power savings, the reduction in temperature or temperature gradient, or both resulting from the lack of beam correspondence.

Aspect 27: The method of any of aspects 19 to 26, the transmitting the indication of the operating mode comprising: transmitting, to the first device, an indication to use one or more transmission configuration indication states, one or more subarrays, or a combination thereof, the one or more transmission configuration indication states, the one or more subarrays, or the combination thereof having full beam correspondence for the communications with the second device.

Aspect 28: The method of aspect 27, wherein the one or more transmission configuration indication states, the one or more subarrays, or the combination thereof are used for an initial access procedure, for a beam failure recovery procedure, or both.

Aspect 29: The method of any of aspects 27 or 28, wherein the one or more transmission configuration indication states, the one or more subarrays, or the combination thereof are used for a low power mode, a high temperature or temperature gradient mode, or both.

Aspect 30: The method of any of aspects 27 to 29, wherein the full beam correspondence comprises a calibration adjusted same set of beam weights, antenna amplitudes, antenna phases, or a combination thereof that are used for both a downlink beam and an uplink beam for the communications with the second device.

Aspect 31: The method of any of aspects 19 to 30, the capability indicating the status for dynamic beam correspondence with the second device comprising a mixed beam correspondence mode operation indication.

Aspect 32: The method of any of aspects 19 to 31, the communications with the first device occurring on frequencies that are greater than 24.25 GHz.

Aspect 33: The method of any of aspects 19 to 32, the first device comprising a user equipment (UE) or a customer premises equipment (CPE) in a wireless communications system and the second device comprising a base station, a CPE, a relay device, a router, a repeater, or an integrated access and backhaul (IAB) node in the wireless communications system.

Aspect 34: An apparatus comprising at least one means for performing a method of any of aspects 19 to 33.

Aspect 35: An apparatus for wireless communications comprising a processor; and memory coupled to the processor, the processor and memory configured to perform a method of any of aspects 19 to 33.

Aspect 36: A non-transitory computer-readable medium storing code for wireless communications, the code comprising instructions executable by a processor to perform a method of any of aspects 19 to 33.

What is claimed is:

1. A method for wireless communications at a first device, comprising:
    transmitting, for a second device, a capability indicating a status for dynamic beam correspondence with the second device, transmission of the capability being based at least in part on a first set of antenna elements being different from a second set of antenna elements, the first set of antenna elements used for downlink communications with the second device, and the second set of antenna elements used for uplink communications with the second device, the capability further indicating at least a first beam correspondence capability for a first transmission time interval and a second beam correspondence capability for a second transmission time interval;
    receiving, from the second device, an indication of an operating mode to use for communications with the second device, the operating mode being based at least in part on the capability; and
    communicating with the second device based at least in part on the indication of the operating mode.

2. The method of claim 1, the transmitting the capability comprising:
    transmitting, for the second device, a time-dependent status for the dynamic beam correspondence with the second device, the time-dependent status for the dynamic beam correspondence comprising at least the first beam correspondence capability for the first transmission time interval or the second beam correspondence capability for the second transmission time interval, or both.

3. The method of claim 2, the time-dependent status indicating a beam correspondence capability that changes for different transmission time intervals.

4. The method of claim 1, the first beam correspondence capability comprising an indication of beam correspondence for the first transmission time interval, the second beam correspondence capability comprising an indication of no beam correspondence for the second transmission time interval, or a combination thereof.

5. The method of claim 1, the first transmission time interval and the second transmission time interval comprising one or more different symbols, slots, or subframes.

6. The method of claim 1, the transmitting the capability comprising:
    transmitting, for the second device, a first indication of beam correspondence for one or more first transmission configuration indication states, a second indication of no beam correspondence for one or more second transmission configuration indication states, or a combination thereof.

7. The method of claim 6, wherein the first indication of beam correspondence, the second indication of no beam correspondence, or both are time-dependent.

8. The method of claim 1, the transmitting the capability comprising:
transmitting, for the second device, an indication of no beam correspondence; and
transmitting, for the second device, an amount of power savings, a reduction in temperature or temperature gradient, or both for the communications with the second device, the amount of power savings, the reduction in temperature or temperature gradient, or both resulting from the indication of no beam correspondence.

9. The method of claim 1, the receiving the indication of the operating mode comprising:
receiving, from the second device, an indication to use one or more transmission configuration indication states, one or more subarrays, or a combination thereof, the one or more transmission configuration indication states, the one or more subarrays, or the combination thereof having full beam correspondence for the communications with the second device.

10. The method of claim 9, wherein the one or more transmission configuration indication states, the one or more subarrays, or the combination thereof are used for an initial access procedure, for a beam failure recovery procedure, or both.

11. The method of claim 9, wherein the one or more transmission configuration indication states, the one or more subarrays, or the combination thereof are used for a low power mode, a high temperature or temperature gradient mode, or both.

12. The method of claim 9, wherein the full beam correspondence comprises a calibration adjusted same set of beam weights, antenna amplitudes, antenna phases, or a combination thereof that are used for both a downlink beam and an uplink beam for the communications with the second device.

13. The method of claim 1, the capability indicating the status for dynamic beam correspondence with the second device comprising a mixed beam correspondence mode operation indication.

14. The method of claim 1, the communications with the second device occurring on frequencies that are greater than 24.25 GHz.

15. The method of claim 1, the first device comprising a user equipment (UE) or a customer premises equipment (CPE) in a wireless communications system and the second device comprising a network device, a CPE, a relay device, a router, a repeater, or an integrated access and backhaul (IAB) node in the wireless communications system.

16. A method for wireless communications at a second device, comprising:
receiving a capability indicating a status for dynamic beam correspondence between a first device and the second device, the capability further indicating at least a first beam correspondence capability for a first transmission time interval and a second beam correspondence capability for a second transmission time interval;
transmitting an indication of an operating mode to use for communications with the second device, the operating mode based at least in part on the capability; and
communicating based at least in part on the indication of the operating mode.

17. The method of claim 16, the receiving the capability comprising:
receiving a time-dependent status for the dynamic beam correspondence between the first device and the second device, the time-dependent status for the dynamic beam correspondence comprising at least the first beam correspondence capability for the first transmission time interval or the second beam correspondence capability for the second transmission time interval, or both.

18. The method of claim 17, the time-dependent status indicating a beam correspondence capability that changes for different transmission time intervals.

19. The method of claim 16, the first beam correspondence capability comprising an indication of beam correspondence for the first transmission time interval, the second beam correspondence capability comprising an indication of no beam correspondence for the second transmission time interval, or a combination thereof.

20. The method of claim 16, the receiving the capability comprising:
receiving, from the first device, a first indication of beam correspondence for one or more first transmission configuration indication states, a second indication of no beam correspondence for one or more second transmission configuration indication states, or a combination thereof, wherein the first indication of beam correspondence, the second indication of no beam correspondence, or both are time-dependent.

21. The method of claim 16, the receiving the capability comprising:
receiving, from the first device, an indication of no beam correspondence; and
receiving, from the first device, an amount of power savings, a reduction in temperature or temperature gradient, or both for the communications with the first device, the amount of power savings, the reduction in temperature or temperature gradient, or both resulting from the indication of no beam correspondence.

22. The method of claim 16, the transmitting the indication of the operating mode comprising:
transmitting an indication to use one or more transmission configuration indication states, one or more subarrays, or a combination thereof, wherein the one or more transmission configuration indication states, the one or more subarrays, or the combination thereof have full beam correspondence for the communications with the first device.

23. The method of claim 22, wherein the one or more transmission configuration indication states, the one or more subarrays, or the combination thereof are used for an initial access procedure, for a beam failure recovery procedure, or both.

24. The method of claim 22, wherein the one or more transmission configuration indication states, the one or more subarrays, or the combination thereof are used for a low power mode, a high temperature or temperature gradient mode, or both.

25. The method of claim 22, wherein the full beam correspondence comprises a calibration adjusted same set of beam weights, antenna amplitudes, antenna phases, or a combination thereof that are used for both a downlink beam and an uplink beam for the communications with the first device.

26. An apparatus for wireless communications at a first device, comprising:
one or more memories; and one or more processors coupled with the one or more memories and configured to cause the first device to:
transmit, for a second device, a capability that indicates a status for dynamic beam correspondence with the second device, wherein the transmitted capability is based at least in part on a first set of antenna elements and a second set of antenna elements, the first set of antenna elements used for downlink communications with the second device and different from the second set of antenna elements used for uplink communications with the second device, wherein the capability further indicates at least a first beam correspondence capability for a first transmission time interval and a second beam correspondence capability for a second transmission time interval;
receive, from the second device, an indication of an operating mode to use for communications with the second device, the operating mode based at least in part on the capability; and
communicate with the second device based at least in part on the indication of the operating mode.

27. The apparatus of claim 26, wherein, to transmit the capability, the one or more processors are configured to cause the first device to:
transmit, for the second device via at least one antenna of the second set of antenna elements, a time-dependent status for the dynamic beam correspondence with the second device, wherein the time-dependent status for the dynamic beam correspondence comprises at least the first beam correspondence capability for the first transmission time interval or the second beam correspondence capability for the second transmission time interval, or both.

28. The apparatus of claim 27, wherein the time-dependent status indicates a beam correspondence capability that changes for different transmission time intervals.

29. The apparatus of claim 26, wherein, to transmit the capability, the one or more processors are configured to cause the first device to:
transmit, for the second device via at least one antenna of the second set of antenna elements, a first indication of beam correspondence for one or more first transmission configuration indication states, a second indication of no beam correspondence for one or more second transmission configuration indication states, or a combination thereof.

30. The apparatus of claim 29, wherein the first indication of beam correspondence, the second indication of no beam correspondence, or both are time-dependent.

31. The apparatus of claim 26, wherein the first beam correspondence capability comprises an indication of beam correspondence for the first transmission time interval, the second beam correspondence capability comprises an indication of no beam correspondence for the second transmission time interval, or a combination thereof.

32. The apparatus of claim 26, wherein the first transmission time interval and the second transmission time interval comprise one or more different symbols, slots, or subframes.

33. The apparatus of claim 26, wherein, to transmit the capability, the one or more processors are configured to cause the first device to:
transmit, for the second device, an indication of no beam correspondence; and
transmit, for the second device, an amount of power savings, a reduction in temperature or temperature gradient, or both for the communications with the second device, the amount of power savings, the reduction in temperature or temperature gradient, or both that result from the indication of no beam correspondence.

34. The apparatus of claim 26, wherein, to receive the indication of the operating mode, the one or more processors are configured to cause the first device to:
receive, from the second device, an indication to use one or more transmission configuration indication states, one or more subarrays, or a combination thereof, wherein the one or more transmission configuration indication states, the one or more subarrays, or the combination thereof have full beam correspondence for the communications with the second device.

35. The apparatus of claim 34, wherein the one or more transmission configuration indication states, the one or more subarrays, or the combination thereof are used for an initial access procedure, for a beam failure recovery procedure, or both.

36. The apparatus of claim 34, wherein the one or more transmission configuration indication states, the one or more subarrays, or the combination thereof are used for a low power mode, a high temperature or temperature gradient mode, or both.

37. The apparatus of claim 34, wherein the full beam correspondence comprises a calibration adjusted same set of beam weights, antenna amplitudes, antenna phases, or a combination thereof that are used for both a downlink beam and an uplink beam for the communications with the second device.

38. The apparatus of claim 26, wherein the capability that indicates the status for dynamic beam correspondence with the second device comprises a mixed beam correspondence mode operation indication.

39. The apparatus of claim 26, wherein the communications with the second device occur on frequencies that are greater than 24.25 GHz.

40. The apparatus of claim 26, wherein the first device comprises a user equipment (UE) or a customer premises equipment (CPE) in a wireless communications system and the second device comprises a network device, a CPE, a relay device, a router, a repeater, or an integrated access and backhaul (IAB) node in the wireless communications system.

41. An apparatus for wireless communications at a second device, comprising:
one or more memories; and
one or more processors coupled with the one or more memories and configured to cause the second device to:
receive a capability that indicates a status for dynamic beam correspondence between a first device and the second device, wherein the capability further indicates at least a first beam correspondence capability for a first transmission time interval and a second beam correspondence capability for a second transmission time interval;
transmit an indication of an operating mode to use for communications with the second device, the operating mode based at least in part on the capability; and
communicate based at least in part on the indication of the operating mode.

42. The apparatus of claim 41, wherein, to transmit the indication of the operating mode, the one or more processors are configured to cause the second device to:
transmit, via at least one antenna, an indication to use one or more transmission configuration indication states, one or more subarrays, or a combination thereof, wherein the one or more transmission configuration indication states, the one or more subarrays, or the combination thereof have full beam correspondence for the communications with the first device.

43. The apparatus of claim 41, wherein, to receive the capability, the one or more processors are configured to cause the second device to:
receive a time-dependent status for the dynamic beam correspondence between the first device and the second device, wherein the time-dependent status for the dynamic beam correspondence comprises at least the first beam correspondence capability for the first transmission time interval or the second beam correspondence capability for the second transmission time interval, or both.

44. The apparatus of claim 43, wherein the time-dependent status indicates a beam correspondence capability that changes for different transmission time intervals.

45. The apparatus of claim 41, wherein the first beam correspondence capability comprises an indication of beam correspondence for the first transmission time interval, the second beam correspondence capability comprises an indication of no beam correspondence for the second transmission time interval, or a combination thereof.

46. The apparatus of claim 41, wherein, to receive the capability, the one or more processors are configured to cause the second device to:
receive an indication of no beam correspondence; and
receive an amount of power savings, a reduction in temperature or temperature gradient, or both for the communications with the first device, the amount of power savings, the reduction in temperature or temperature gradient, or both that result from the indication of no beam correspondence.

47. The apparatus of claim 41, wherein, to transmit the indication of the operating mode, the one or more processors are configured to cause the second device to:
transmit an indication to use one or more transmission configuration indication states, one or more subarrays, or a combination thereof, wherein the one or more transmission configuration indication states, the one or more subarrays, or the combination thereof have full beam correspondence for the communications with the first device.

48. The apparatus of claim 47, wherein the one or more transmission configuration indication states, the one or more subarrays, or the combination thereof are used for an initial access procedure, for a beam failure recovery procedure, or both.

49. The apparatus of claim 47, wherein the one or more transmission configuration indication states, the one or more subarrays, or the combination thereof are used for a low power mode, a high temperature or temperature gradient mode, or both.

50. The apparatus of claim 47, wherein the full beam correspondence comprises a calibration adjusted same set of beam weights, antenna amplitudes, antenna phases, or a combination thereof that are used for both a downlink beam and an uplink beam for the communications with the first device.

51. A non-transitory computer-readable medium storing code for wireless communications at a first device, the code comprising instructions executable by one or more processors to cause the first device to:
transmit, for a second device, a capability indicating a status for dynamic beam correspondence with the second device, transmission of the capability being based at least in part on a first set of antenna elements being different from a second set of antenna elements, the first set of antenna elements used for downlink communications with the second device, and the second set of antenna elements used for uplink communications with the second device, the capability further indicating at least a first beam correspondence capability for a first transmission time interval and a second beam correspondence capability for a second transmission time interval;
receive, from the second device, an indication of an operating mode to use for communications with the second device, the operating mode being based at least in part on the capability; and
communicate with the second device based at least in part on the indication of the operating mode.

52. The non-transitory computer-readable medium of claim 51, the code comprising instructions further executable by the one or more processors to cause the first device to:
transmit, for the second device, a time-dependent status for the dynamic beam correspondence with the second device, the time-dependent status for the dynamic beam correspondence comprising at least the first beam correspondence capability for the first transmission time interval or the second beam correspondence capability for the second transmission time interval, or both.

53. The non-transitory computer-readable medium of claim 51, the code comprising instructions further executable by the one or more processors to cause the first device to:
transmit, for the second device, a first indication of beam correspondence for one or more first transmission configuration indication states, a second indication of no beam correspondence for one or more second transmission configuration indication states, or a combination thereof.

54. The non-transitory computer-readable medium of claim 51, the code comprising instructions further executable by the one or more processors to cause the first device to:
transmit, for the second device, an indication of no beam correspondence; and
transmit, for the second device, an amount of power savings, a reduction in temperature or temperature gradient, or both for the communications with the second device, the amount of power savings, the reduction in temperature or temperature gradient, or both that result from the indication of no beam correspondence.

55. A non-transitory computer-readable medium storing code for wireless communications at a second device, the code comprising instructions executable by one or more processors to cause the second device to:
receive a capability indicating a status for dynamic beam correspondence between a first device and the second device, the capability further indicating at least a first beam correspondence capability for a first transmission time interval and a second beam correspondence capability for a second transmission time interval;
transmit an indication of an operating mode to use for communications with the second device, the operating mode based at least in part on the capability; and
communicate based at least in part on the indication of the operating mode.

56. The non-transitory computer-readable medium of claim 55, the code comprising instructions further executable by the one or more processors to cause the second device to:

receive a time-dependent status for the dynamic beam correspondence with the second device, the time-dependent status for the dynamic beam correspondence comprising at least the first beam correspondence capability for the first transmission time interval or the second beam correspondence capability for the second transmission time interval, or both.

57. The non-transitory computer-readable medium of claim 55, the code comprising instructions further executable by the one or more processors to cause the second device to:
receive a first indication of beam correspondence for one or more first transmission configuration indication states, a second indication of no beam correspondence for one or more second transmission configuration indication states, or a combination thereof.

58. The non-transitory computer-readable medium of claim 55, the code comprising instructions further executable by the one or more processors to cause the second device to:
receive an indication of no beam correspondence; and
receive an amount of power savings, a reduction in temperature or temperature gradient, or both for the communications with the first device, the amount of power savings, the reduction in temperature or temperature gradient, or both that result from the indication of no beam correspondence.

* * * * *